United States Patent
Teshima

(10) Patent No.: US 6,852,463 B2
(45) Date of Patent: Feb. 8, 2005

(54) APPARATUS FOR PRODUCING TONER, METHOD FOR PRODUCING TONER, AND TONER

(75) Inventor: Takashi Teshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 10/379,994

(22) Filed: Mar. 6, 2003

(65) Prior Publication Data

US 2003/0224271 A1 Dec. 4, 2003

(30) Foreign Application Priority Data

| Mar. 7, 2002 | (JP) | P2002-062600 |
| Mar. 7, 2002 | (JP) | P2002-062601 |
| Mar. 20, 2002 | (JP) | P2002-079810 |

(51) Int. Cl.$^7$ .................................................. G03G 5/00
(52) U.S. Cl. ................................. 430/110.3; 430/137.1; 430/137.19; 310/311; 310/328; 347/68; 347/56; 425/6
(58) Field of Search ........................... 430/110.3, 137.1, 430/137.19; 310/311, 328; 347/68, 56; 425/6

(56) References Cited

U.S. PATENT DOCUMENTS

| 4,076,640 A | 2/1978 | Forgensi et al. |
| 5,240,803 A | 8/1993 | Ota |
| 6,083,454 A | 7/2000 | Tang et al. |

OTHER PUBLICATIONS

Japanese Abstract No. 56008152 dated Jan. 27, 1981.

Japanese Abstract No. 60117258 dated Jun. 24, 1985.

*Primary Examiner*—Mark A. Chapman
(74) *Attorney, Agent, or Firm*—Sughrue Mion, PLLC

(57) ABSTRACT

An apparatus for the production of a toner from a starting material having a fluidity includes a head portion and a solidifying portion. The head portion for ejecting the starting material includes a starting material storing portion, which stores the starting material, a piezoelectric material, which generates a pressure pulse for applying the pressure pulse to the starting material and an ejection portion, which ejects the starting material with the pressure pulse. The solidifying portion solidifies the starting material ejected from the head portion into a particulate material.

73 Claims, 10 Drawing Sheets

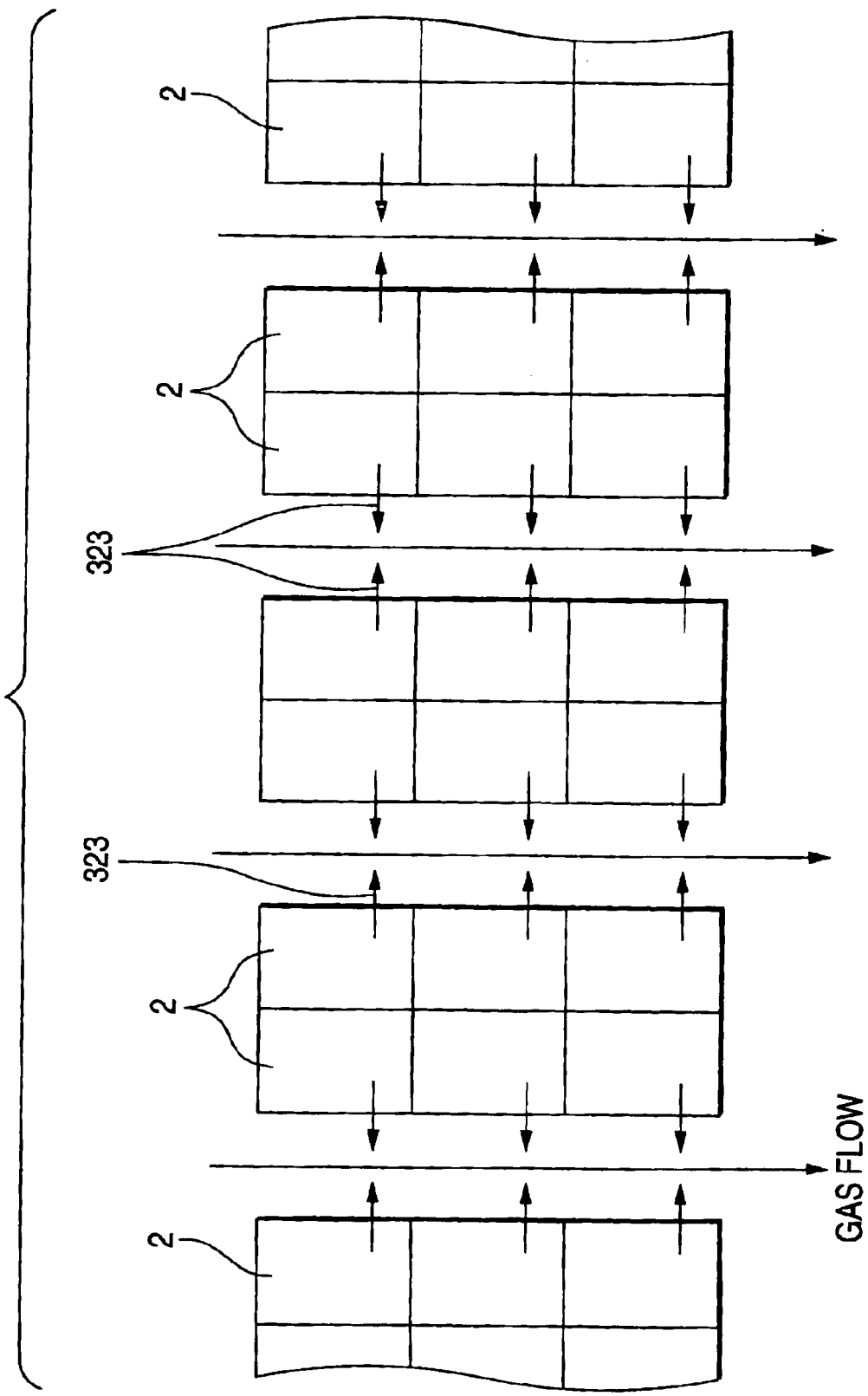

APPARATUS FOR PRODUCING TONER, METHOD FOR PRODUCING TONER, AND TONER

BACKGROUND OF THE INVENTION

The present invention relates to an apparatus for producing a toner, a method for producing a toner, and a toner.

As electrophotographic processes there are known many processes. An electrophotographic process normally includes a step of forming an electrostatic latent image on a photoreceptor by various means utilizing a photoelectrically-conductive material (exposing step), a development step of developing the latent image with a toner, a transfer step of transferring the toner onto a transferring material such as paper, and a step of fixing the toner image by heating, pressing or the like using a fixing roller.

Examples of the process for producing the toner for use in such an electrophotography include pulverizing process, polymerization process, and spray drying process.

In the pulverizing process, a starting material including a resin which is a main component (hereinafter simply referred to as "resin") and a coloring agent is kneaded at a temperature of higher than the softening point of the resin to obtain a kneaded material which is then cooled and ground. The pulverizing process is advantageous in that the degree of selection of starting material is great, making it relatively easy to produce a desired toner. However, the toner obtained by pulverizing process has a great dispersion of shape among particles and a broad particle diameter distribution to disadvantage. As a result, the dispersion of chargeability, fixability, etc. among the toner particles is raised, thereby reducing the reliability of the toner as a whole.

In the polymerization process, a monomer which is a constituent of a resin is subjected to polymerization reaction in a liquid phase to produce a desired resin as a particulate toner. This polymerization process is advantageous in that the resulting particulate toner can be shaped in a form having a relatively high sphericity (close to geometrically complete sphere). However, the polymerization process cannot give a sufficiently small dispersion of particle diameter among the particles. This polymerization process normally involves the utilization of the interfacial properties of the polymerizable monomer with an aqueous medium in which it is dispersed to adjust the size of the particles thus obtained. However, in the case where such interfacial properties are utilized, it is normally essential that chemicals such as surface active agent be added to the aqueous medium. As a result, the toner thus obtained is affected by these chemicals and thus can be poor in electrical properties (chargeability) and environmental resistance such as moisture resistance. The polymerization process is also disadvantageous in that the degree of selection of resin material is small, making it difficult to obtain a toner having desired properties.

In the spray drying process, a high pressure gas is used to spray the starting material of toner dissolved in a solvent, thereby obtaining a finely divided powder as a toner. This spray drying process is advantageous in that the above pulverizing step is not required. However, this spray drying process involves the use of a high pressure gas to spray the starting material and thus can difficultly control the spray conditions of the starting material accurately. Therefore, it is made difficult to produce efficiently a particulate toner having a desired shape and size. Further, in the spray drying process, the dispersion of size of particles formed by spraying is great, raising the dispersion of moving rate of particles. Therefore, before the solidification of the starting material thus sprayed, the particles sprayed can be subject to collision and agglomeration to form an odd-shaped powder. Thus, the finally obtained particulate toner has an increased dispersion of shape and size. Accordingly, the toner obtained by spray drying process has a great dispersion of shape and size among the particles and hence a great dispersion of chargeability, fixability, etc. among the particles. As a result, the reliability of the toner is lowered as a whole.

SUMMARY OF THE INVENTION

It is therefore objects of the present invention to provide a toner having a uniform shape and a sharp particle size distribution, and an apparatus and a method for producing the toner.

These objects are accomplished by the following constitutions (1) to (71) of the invention:

1. An apparatus for producing a toner from a starting material having a fluidity, comprising:
    a head portion, including:
        a starting material storing portion, which stores the starting material;
        a piezoelectric material, which generates a pressure pulse and applies the pressure pulse to the starting material; and
        an ejection portion, which ejects the starting material with the pressure pulse from the head portion; and
    a solidifying portion, which solidifies the starting material ejected from the head portion into a particulate material.
2. The apparatus according to clause 1, wherein the head portion includes an acoustic lens which converges the pressure pulse; and
    wherein the ejection portion ejects the starting material with the pressure pulse converged by the acoustic lens.
3. The apparatus according to clause 1, wherein the acoustic lens is disposed such that a focal point is formed in the vicinity of the ejection portion.
4. The apparatus according to clause 1, wherein the head portion includes a narrowing member which has a shape that converges toward the ejection portion, and the narrowing member is disposed between the acoustic lens and the ejection portion.
5. The apparatus according to clause 1, further comprising:
    a conveying unit, which conveys the starting material ejected from the head portion.
6. The apparatus according to clause 5, wherein the conveying unit is a gas flow supplying unit which supplies a gas flow.
7. The apparatus according to clause 1, wherein the head portion is a plurality of head portions.
8. The apparatus according to clause 7, further comprising:
    a gas injection nozzle which injects a gas; and
    wherein the gas injection nozzle is disposed between the adjacent ejection portions of the plurality of head portions.
9. The apparatus according to clause 7, wherein at least two adjacent head portions eject the starting material at different timings.
10. The apparatus according to clause 1, further comprising a voltage applying unit which applies a voltage to the solidifying portion.
11. The apparatus according to clause 1, wherein the ejection portion has substantially circular shape, and has a diameter of from 5 μm to 500 μm.
12. An apparatus for producing a toner from a starting material having a fluidity, comprising:

a head portion, including:
  a starting material storing portion, which stores the starting material;
  a heating element, which applies a heat energy to the starting material to generate an air bubble in the starting material storing portion; and
  an ejection portion, which ejects the starting material with the volume change of the air bubble; and
a solidifying portion, which solidifies the starting material ejected from the head portion into a particulate material.

13. The apparatus according to clause 12, wherein the heating element generates heat by applying an alternating voltage to the heating element.

14. The apparatus according to clause 12, further comprising:
  a conveying unit, which conveys the starting material ejected from the head portion.

15. The apparatus according to clause 14, wherein the conveying unit is a gas flow supplying unit which supplies a gas flow.

16. The apparatus according to clause 12, wherein the head portion is a plurality of head portions.

17. The apparatus according to clause 16, further comprising:
  a gas injection nozzle which injects a gas; and
  wherein the gas injection nozzle is disposed between the adjacent ejection portions of the head portions.

18. The apparatus according to clause 16, wherein at least two adjacent head portions eject the starting material at different timings.

19. The apparatus according to clause 12, further comprising a voltage applying unit which applies a voltage to the solidifying portion.

20. The apparatus according to clause 12, wherein the ejection portion has substantially circular shape, and has a diameter of from 5 $\mu$m to 500 $\mu$m.

21. A method for producing a toner from a starting material having a fluidity, comprising the steps of:
  ejecting the starting material intermittently with a pressure pulse generated by a piezoelectric material from a head portion; and
  solidifying the starting material while being conveyed with an air flow through a solidifying portion to form a particulate material.

22. The method according to clause 21, further comprising the step of:
  converging the pressure pulse.

23. The method according to clause 21, wherein the pressure pulse is applied to the starting material stored in a starting material storing portion; and
  wherein the starting material is ejected with the pressure pulse generated by the piezoelectric material from the head portion.

24. The method according to clause 21, further comprising the steps of:
  providing a gas flow in substantially one direction; and
  discharging the starting material ejected by the pressure pulse into the gas flow.

25. The method according to clause 21, wherein the starting material is ejected with the pressure pulse from a plurality of head portions.

26. The method according to clause 25, further comprising the step of:
  injecting a gas from the gap between adjacent ejection portions of the head portions.

27. The method according to clause 25, wherein the timing at which the starting material is ejected from at least two adjacent head portions are different.

28. The method according to clause 21, wherein the starting material is ejected while a voltage having the same polarity as that of the starting material is applied to the solidifying portion.

29. The method according to clause 21, wherein the initial velocity of the starting material ejected from the head portion is from 0.1 to 10 m/sec.

30. The method according to clause 21, wherein the viscosity of the starting material in the head portion is from 1 to 1,000 cps.

31. The method according to clause 21, wherein the frequency of the piezoelectric material is from 10 kHz to 500 MHz.

32. The method according to clause 21, wherein the starting material has at least part of its components dissolved in a solvent.

33. The method according to clause 32, further comprising the step of:
  removing the solvent from the starting material at the solidifying portion to solidify the starting material.

34. The method according to clause 33, wherein the starting material is heated at the solidifying portion so that it is solidified.

35. The method according to clause 21, wherein at least part of the components of the starting material is in molten state.

36. The method according to clause 33, wherein the starting material is cooled at the solidifying portion so that it is solidified.

37. The method according to clause 21, wherein the amount of one droplet of the starting material to be ejected from the head portion is from 0.05 to 500 pl.

38. A method for producing a toner from a starting material having a fluidity, comprising the steps of:
  ejecting the starting material intermittently with a volume change of an air bubble from a head portion; and
  solidifying the starting material while being conveyed with an air flow through a solidifying portion to form a particulate material.

39. The method according to clause 38, wherein a heat energy generated by a heating element is applied to the starting material stored in a starting material storing portion to generate an air bubble; and
  wherein the starting material is ejected with the volume change of the air bubble from the head portion.

40. The method according to clause 39, wherein an alternating voltage is applied to the heating element to generate the heat energy.

41. The method according to clause 40, wherein the frequency of the alternating voltage applied to the heating element is from 1 to 50 kHz.

42 The method according to clause 38, further comprising the steps of:
  providing a gas flow in substantially one direction; and
  discharging the starting material ejected by the pressure pulse into the gas flow.

43. The method according to clause 38, wherein the starting material is ejected with the pressure pulse from a plurality of head portions.

44. The method according to clause 43, further comprising the step of:
  injecting a gas from the gap between adjacent ejection portions of the head portions.

45. The method according to clause 43, wherein the timing at which the starting material is ejected from at least two adjacent head portions are different.
46. The method according to clause 38, wherein the starting material is ejected while a voltage having the same polarity as that of the starting material is applied to the solidifying portion.
47. The method according to clause 38, wherein the initial velocity of the starting material ejected from the head portion is from 0.1 to 10 m/sec.
48. The method according to clause 38, wherein the viscosity of the starting material in the head portion is from 1 to 1,000 cps.
49. The method according to clause 38, wherein the starting material has at least part of its components dissolved in a solvent.
50. The method according to clause 49, further comprising the step of:
    removing the solvent from the starting material at the solidifying portion to solidify the starting material.
51. The method according to clause 50, wherein the starting material is heated at the solidifying portion so that it is solidified.
52. The method according to clause 38, wherein at least part of the components of the starting material is in molten state.
53. The method according to clause 50, wherein the starting material is cooled at the solidifying portion so that it is solidified.
54. The method according to clause 38, wherein the amount of one droplet of the starting material to be ejected from the head portion is from 0.05 to 500 pl.
55. A toner produced by using the apparatus for producing the toner according to clause 1.
56. A toner produced by the method for producing the toner according to clause 21.
57. A toner produced by using the apparatus for producing the toner according to clause 12.
58. A toner produced by the method for producing the toner according to clause 38.
59. The toner according to clause 55, wherein the toner has a weight-average particle of from 2 to 20 $\mu$m.
60. The toner according to clause 56, wherein the toner has a weight-average particle of from 2 to 20 $\mu$m.
61. The toner according to clause 57, wherein the toner has a weight-average particle of from 2 to 20 $\mu$m.
62. The toner according to clause 58, wherein the toner has a weight-average particle of from 2 to 20 $\mu$m.
63. The toner according to clause 55, wherein the standard deviation of particle diameter of particles on the basis of weight is not greater than 1.5 $\mu$m.
64. The toner according to clause 56, wherein the standard deviation of particle diameter of particles on the basis of weight is not greater than 1.5 $\mu$m.
65. The toner according to clause 57, wherein the standard deviation of particle diameter of particles on the basis of weight is not greater than 1.5 $\mu$m.
66. The toner according to clause 58, wherein the standard deviation of particle diameter of particles on the basis of weight is not greater than 1.5 $\mu$m.
67. The toner according to clause 55, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.
68. The toner according to clause 56, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.
68. The toner according to clause 57, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.
70. The toner according to clause 58, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.
71. A method for producing a toner from a starting material having a fluidity by using the apparatus for producing the toner according to clause 1, comprising the steps of:
    providing a starting material storing portion, which stores the starting material;
    generating a pressure pulse by a piezoelectric material;
    applying the pressure pulse to the starting material;
    ejecting the starting material with the pressure pulse from a head portion by an ejection portion; and
    solidifying the starting material ejected from the head portion into a particulate material by a solidifying portion.
72. The method according to clause 69, further comprising the steps of:
    converging the pressure pulse by an acoustic lens; and
    wherein the starting material is ejected with the pressure pulse converged by the acoustic lens.
73. A method for producing a toner from a starting material having a fluidity by using the apparatus for producing the toner according to clause 12, comprising the steps of:
    providing a starting material storing portion, which stores the starting material;
    applying a heat energy to the starting material by a heating element;
    generating an air bubble in the starting material storing portion by the heat energy; and
    ejecting the starting material with the volume change of the air bubble by an ejection portion; and
    solidifying the starting material ejected from the head portion into a particulate material by a solidifying portion.

In the above configurations and methods, a toner having a uniform shape and a sharp particle size distribution is produced.

This effect can be more fairly exerted by properly adjusting the production conditions such as composition of starting material, frequency of the piezoelectric material, aperture of the ejection portion and temperature and viscosity of starting material.

In the above configurations and methods, this effect can be more fairly exerted by properly adjusting the production conditions such as composition of starting material, frequency of the piezoelectric material, aperture and focal length of the acoustic lens and temperature and viscosity of starting material.

In the above configurations and methods, this effect can be more fairly exerted by properly adjusting the production conditions such as composition of starting material, frequency of alternating voltage applied to the heating element, aperture of the ejection portion and temperature and viscosity of starting material.

BRIEF DESCRIPTION OF THE DRAWINGS

The above objects and advantages of the present invention will become more apparent by describing in detail preferred exemplary embodiments thereof with reference to the accompanying drawings, wherein:

FIG. 10 is an enlarged sectional view of a part in the vicinity of the head portion of the apparatus for the production of a toner according to a ninth embodiment.

DETAILED DESCRIPTION OF THE PREFERRED EMBODIMENTS

Preferred embodiments of the apparatus and process for producing a toner of the invention and the toner of the invention will be described in detail in connection with the attached drawings.

Figure 1:
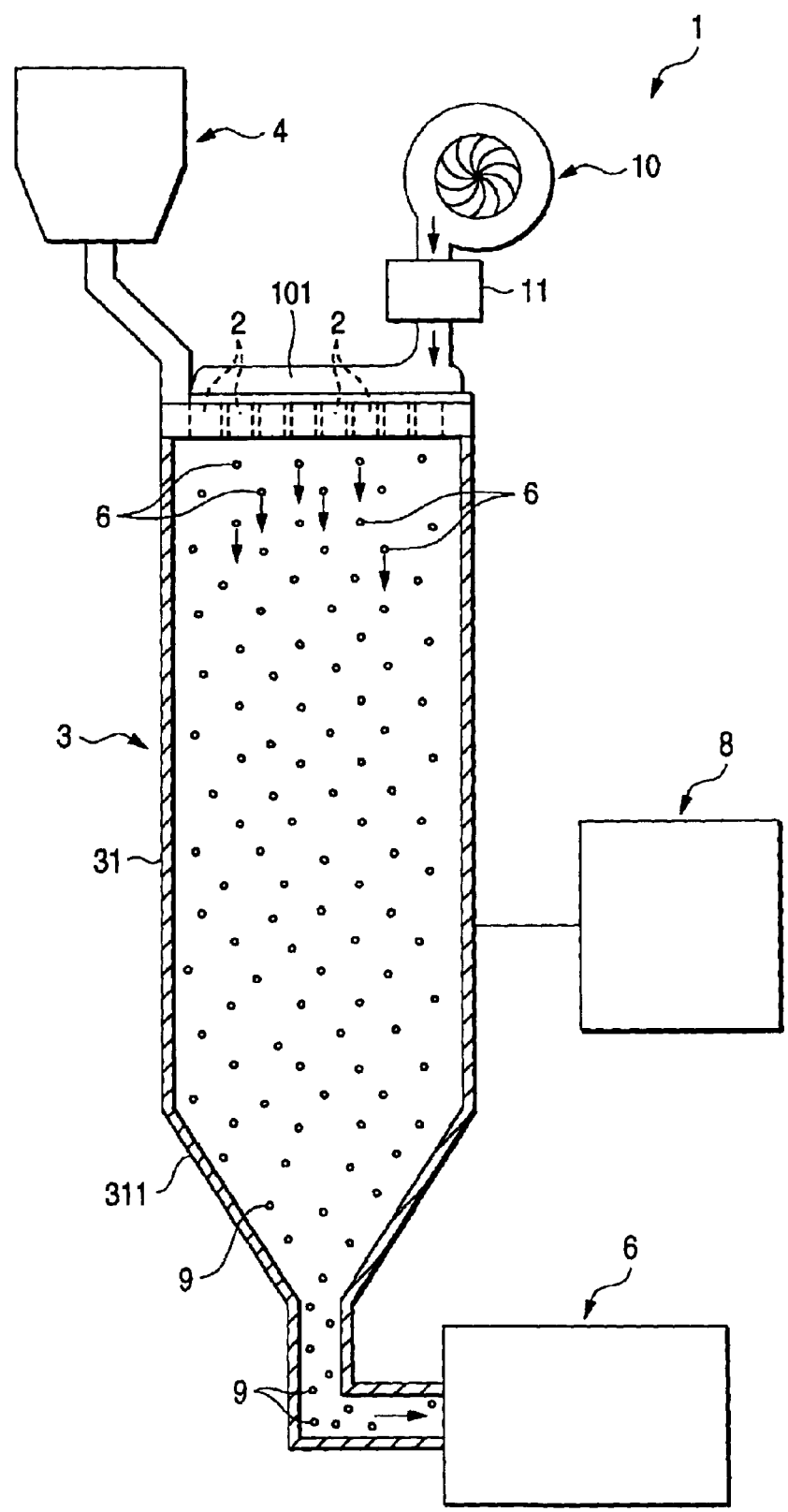
FIG. 1 is a schematic longitudinal section of the apparatus for producing a toner according to the invention.
Figure 2:
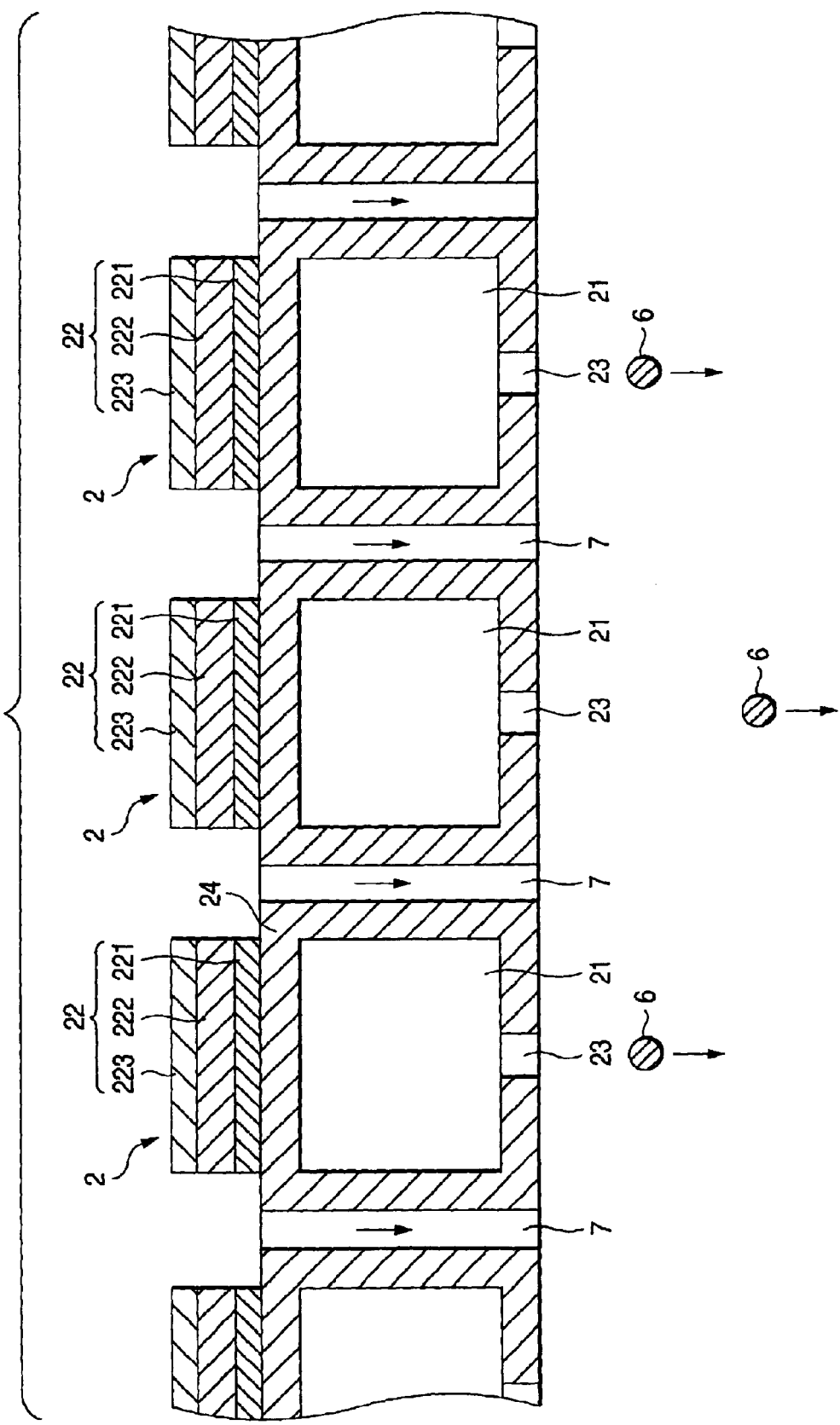
FIG. 2 is an enlarged sectional view of a part in the vicinity of the head portion of the apparatus for producing a toner according to a first embodiment of the invention.

FIG. 1 is a schematic longitudinal section of the apparatus for producing a toner according to the first embodiment of the invention. FIG. 2 is an enlarged sectional view of a part in the vicinity of the head portion of the apparatus for producing a toner of FIG. 1.

[Construction Material]

The starting material 6 from which the toner of the invention is produced will be first described. The toner of the invention is produced from the starting material 6 having a fluidity. The starting material 6 normally includes at least a resin (or a monomer, dimer, oligomer or the like as its precursor) as a main component and a coloring agent incorporated therein.

The resin as a main component (hereinafter referred to as "resin"), a coloring agent and other components constituting the starting material 6 will be described hereinafter.

1. Resin (Binder Resin)

Examples of the resin (binder resin) include styrene-based resins which are homopolymers or copolymers containing styrene or styrene-substituted compound (e.g., polystyrene, poly-α-methylstyrene, chloropolystyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic acid ester copolymer, styrene-methacrylic acid ester copolymer, styrene-acrylic acid ester-methacrylic acid ester copolymer, styrene-α-methyl chloroacrylate copolymer, styrene-acrylonitrile-acrylic acid ester copolymer, styrene-vinyl methyl ether copolymer), polyester resin, epoxy resin, urethane-modified epoxy resin, silicone-modified epoxy resin, vinyl chloride resin, rosin-modified maleic acid resin, phenyl resin, polyethylene, polypropylene, ionomoner resin, polyurethane resin, silicone resin, ketone resin, ethylene-ethyl acrylate copolymer, xylene resin, polyvinyl butyral resin, terpene resin, phenol resin, aliphatic hydrocarbon resin, and alicyclic hydrocarbon resin. These resins may be used singly or in combination of two or more thereof. In the case where the starting material 6 is subjected to polymerization reaction at the solidifying portion 3 described later to produce the toner, the above resin materials are normally used in the form of monomer, dimer, oligomer, etc.

The content of these resins in the starting material 6 is not specifically limited but is preferably from 50 to 95% by weight, more preferably from 80 to 94% by weight.

2. Coloring Agent

As the coloring agent there may be used a pigment, dye or the like. Examples of such a pigment or dye include carbon black, spirit black, lamp black (C. I. No. 77266), magnetite, titanium black, chrome yellow, cadmium yellow, mineral fast yellow, navel yellow, naphthol yellow S, Hansa Yellow G, Permanent Yellow NCG, chrome yellow, benzidine yellow, quinoline yellow, Tartrazine Lake, chrome orange, molybdenum orange, permanent orange GTR, pyrazolone orange, benzidine orange G, cadmium red, permanent red 4R, watching red calcium salt, Eosin Lake, Brilliant Carmine 3B, manganese purple, fast violet B, methyl violet lake, Prussian blue, cobalt blue, alkali blue lake, Victoria Blue Lake, fast sky blue, indanthrene blue BC, ultramarine, aniline blue, phthalocyanine blue, chalcoyl blue, chrome green, chromium oxide, pigment green B, malachite green lake, phthalocyanine green, final yellow green G, rhodamine 6G, quinacridone, rose bengal (C. I. No. 45432), C. I. direct red 1, C. I. direct red 4, C. I. acid red 1, C. I. basic red 1, C. I. mordant red 30, C. I. pigment red 48:1, C. I. pigment red 57:1, C. I. pigment red 122, C. I. pigment red 184, C. I. direct blue 1, C. I. direct blue 2, C. I. acid blue 9, C. I. acid blue 15, C. I. basic blue 3, C. I. basic blue 5, C. I. mordant blue 7, C. I. pigment blue 15:1, C. I. pigment blue 15:3, C. I. pigment blue 5:1, C. I. direct green 6, C. I. basic green 4, C. I. basic green 6, C. I. pigment yellow 17, C. I. pigment yellow 93, C. I. pigment yellow 97, C. I. pigment yellow 12, C. I. pigment yellow 180, C. I. pigment yellow 162, nigrosine dye (C. I. No. 50415B), metal complex dye, silica, aluminum oxide, magnetite, magnemite, various ferrites, metal oxide such as cupric oxide, nickel oxide, zinc oxide, zirconium oxide, titanium oxide and magnesium oxide, and magnetic material containing magnetic metal such as Fe, Co and Ni. These pigments or dyes may be used singly or in combination of two or more thereof.

The content of the coloring agent in the starting material 6 is not specifically limited but is preferably from 1 to 10% by weight, more preferably from 2 to 7% by weight. When the content of the coloring agent falls below the above defined lower limit, some coloring agents can difficultly form a visible image having a sufficient density. On the contrary, when the content of the coloring agent exceeds the above defined upper limit, the resulting toner can have a reduced fixability or chargeability.

3. Solvent

The starting material 6 may contain a solvent for rendering the starting material 6 fluid. As such a solvent there may be used any solvent capable of dissolving at least part of the components constituting the starting material 6. The solvent to be used herein can be preferably removed easily at the solidifying portion 3.

Examples of the solvent employable herein include inorganic solvents such as water, carbon disulfide and carbon tetrachloride, and organic solvents such as ketone-based solvent (e.g., methyl ethyl ketone (MEK), acetone, diethyl ketone, methyl isobutyl ketone (MIBK), methyl isopropyl ketone (MIPK), cyclohexanone), alcohol-based solvent (e.g., methanol, ethanol, isopropanol), ether-based solvent (e.g., diethyl ether, diisopropyl ether, 1,2-dimethoxyethane (DME), 1,4-dioxane, tetrahydrofurane (THF), tetrahydropyrane (THP), anisole, diethylene glycol dimethyl ether (diglyme)), cellosolve-based solvent (e.g., methyl cellosolve, ethyl cellosolve, phenyl cellosolve), aliphatic hydrocarbon-based solvent (e.g., hexane, pentane, heptane, cyclohexane), aromatic hydrocarbon-based solvent (e.g., toluene, xylene, benzene), aromatic heterocyclic compound-based solvent (e.g., pyridine, pyrazine, furane, pyrrole, thiophene), amide-based solvent (e.g., N,N-dimethylformamide (DMF), N,N-dimethylacetamide (DMA)), halogen compound-based solvent (e.g., dichloromethane, chloroform, 1,2-dichloroethane) and ester-based solvent (e.g., ethyl acetate, methyl acetate, ethyl formate). These solvents may be used singly or in admixture of two or more thereof.

4. Wax

The starting material 6 may include a wax incorporated therein. A wax is normally used for the purpose of improving the releasability of molded product. Examples of such a wax employable herein include natural waxes such as vegetable-based wax (e.g., candelilla wax, carnauba wax, rice wax, cotton wax, wood wax), animal-based wax (e.g., beeswax, lanoline) and mineral wax (e.g., montan wax, ozokerite, cercine) and petroleum-based wax (e.g., paraffin wax, microwax, microcrystalline wax, petrolatum), synthetic hydrocarbon waxes such as Fischer-Tropsch wax, polyethylene wax (polyethylene resin), polypropylene wax (polypropylene resin), oxide type polyethylene wax and oxide type polypropylene wax, and synthetic waxes such as aliphatic acid amide, ester, ketone and ether (e.g., 1,2-hydroxystearic acid amide, strearic acid amide, anhydrous phthalic acid imide, chlorinated hydrocarbon). These waxes may be used singly or in combination of two or more thereof. Alternatively, as such a wax there may be used a low molecular crystalline polymer resin such as crystalline polymer having a long alkyl group in its side chains (e.g., homopolymer or copolymer of polyacrylate such as poly-n-stearyl methacrylate and poly-n-lauryl methacrylate, e.g., copolymer of n-stearyl acrylate-ethyl methacrylate copolymer)).

The content of the wax in the starting material 6 is not specifically limited but is preferably not greater than 5% by weight, more preferably not greater than 3% by weight. When the content of the wax is too great, the resulting particulate toner is governed by the wax to form coarse particles. Thus, oozing of the wax to the surface of the toner particle can remarkably occur, giving a tendency that the transferring efficiency of the toner is lowered.

The softening point of the wax is not specifically limited but is preferably from 50° C. to 180° C., more preferably from 60° C. to 160° C.

The starting material 6 may further include components other than the above resin, coloring agent, solvent and wax incorporated therein. Examples of these components include magnetic powder, charge-controlling agent, and dispersant.

Examples of the magnetic powder include powders of metal oxide such as magnetite, maghemite, various ferrites, cuprous oxide, nickel oxide, zinc oxide, zirconium oxide, titanium oxide and magnesium oxide and magnetic material including magnetic metal such as Fe, Co and Ni.

Examples of the above charge-controlling agent employable herein include metal oxide of benzoic acid, metal salt of salicylic acid, metal salt of alkylsalicylic acid, metal salt of catechol, metal-containing bisazo dye, nigrosine dye, tetraphenyl borate derivative, quaternary ammonium salt, alkylpridinium salt, chlorinated polyester, and nitrohumic acid.

Examples of the dispersant employable herein include metal soap, inorganic metal salt, organic metal salt, and polyethylene glycol.

Examples of the above metal soap include metal salt of tristearate (e.g., aluminum salt of tristearic acid), metal salt of distearic acid (e.g., aluminum salt of distearic acid, barium salt of distearic acid), metal salt of stearic acid (e.g., calcium salt of stearic acid, lead salt of stearic acid, zinc salt of stearic acid), metal salt of linolenic acid (e.g., cobalt salt of linolenic acid, manganese salt of linolenic acid, lead salt of linolenic acid, zinc salt of linolenic acid), metal salt of octanoic acid (e.g., aluminum salt of octanoic acid, calcium salt of octanoic acid, cobalt salt of octanoic acid), metal salt of oleic acid (e.g., calcium salt of oleic acid, cobalt salt of oleic acid), metal salt of palmitic acid (e.g., zinc salt of palmitic acid), metal salt of napthenic acid (e.g., calcium salt of napthenic acid, cobalt salt of napthenic acid, manganese salt of napthenic acid, lead salt of napthenic acid, zinc salt of napthenic acid), and salt of resin acid (e.g., calcium salt of resin acid, cobalt salt of resin acid, manganese salt of resin acid, zinc salt of resin acid).

Examples of the above inorganic metal salt and organic metal salt include salts containing cations of elements selected from the group consisting of the group IA, IIA and IIIA metals as cationic components and anions selected from the group consisting of halogen, carbonate, acetate, sulfate, borate, nitrate and phosphate as anionic components.

As the additives there may be used zinc stearate, zinc oxide, cerium oxide, etc. besides the above materials.

[Apparatus for Production of Toner]

The apparatus 1 for producing a toner according to the first embodiment includes a head portion 2 for ejecting a starting material 6 having a fluidity for producing a toner, a solidifying portion 3 for solidifying the starting material 6 ejected from the head portion 2 while being conveyed to form a particulate material, a feeder 4 for supplying the starting material 6 into the head portion 2, and a recovery portion 5 for recovering the particulate toner 9 thus produced.

The head portion 2 has a starting material storing portion 21, a piezoelectric element 22 and an ejection portion 23.

The starting material storing portion 21 stores a starting material 6 having a fluidity. The starting material 6 may be in the form of solution having at least part of the components dissolved in a solvent (hereinafter referred simply to as "solution state") or may be molten in at least part of the components thereof (hereinafter referred simply to as "molten state").

The starting material 6 stored in the starting material storing portion 21 is ejected from the ejection portion 23 into the solidifying portion 3 with a pressure pulse from the piezoelectric element 22.

The shape of the ejection portion 23 is not specifically limited but is preferably substantially circular. In this arrangement, the sphericity of the starting material 6 and the particulate toner 9 thus ejected can be enhanced.

The diameter (nozzle diameter) of the ejection portion 23, if it is substantially circular, is preferably from 5 to 500 $\mu$m, more preferably from 10 to 200 $\mu$m. When the diameter of the ejection portion 23 falls below the above defined lower limit, clogging can easily occur, occasionally raising the dispersion of the size of the starting material 6 thus ejected. On the contrary, when the diameter of the ejection portion 23 exceeds the above defined lower limit, some relationships between the negative pressure in the starting material storing portion 21 and the surface tension of the nozzle can cause the starting material 6 thus ejected to surround air bubbles.

As shown in FIG. 2, the piezoelectric element 22 includes a lower electrode (first electrode) 221, a piezoelectric material 222 and an upper electrode (second electrode) 223 laminated in this order. In other words, the piezoelectric element 22 includes the piezoelectric material 222 provided interposed between the upper electrode 223 and the lower electrode 221.

The piezoelectric element 22 acts as a vibration source. A vibration plate 24 vibrates as the piezoelectric element (vibration source) 22 vibrates. The vibration plate 24 has a function of momentarily enhancing the inner pressure of the starting material storing portion 21.

In the head portion 2, the piezoelectric material 222 does not deform when no predetermined ejection signal from a piezoelectric element driving circuit (not shown) is inputted thereto, i.e., when no voltage is applied across the lower electrode 221 and the upper electrode 223 of the piezoelectric element 22. Therefore, the vibration plate 24 does not deform, causing no change of volume of the starting material storing portion 21. Accordingly, the starting material 6 is not ejected from the ejection portion 23.

On the contrary, when a predetermined ejection signal from the piezoelectric element driving circuit is inputted to the piezoelectric element 22, i.e., when a predetermined voltage is applied across the lower electrode 221 and the upper electrode 223 of the piezoelectric element 22, the piezoelectric material 222 is deformed. Accordingly, the vibration plate 24 is drastically deflected (downward deflection as viewed in FIG. 2) that causes a drop (change) of volume of the starting material storing portion 21. Then, the pressure in the starting material storing portion 21 is momentarily enhanced, causing the ejection of the particulate starting material 6 from the ejection portion 23.

When one time ejection of the starting material 6 is terminated, the piezoelectric element driving circuit suspends the application of a voltage across the lower electrode 221 and the upper electrode 223. In this manner, the piezoelectric element 222 is substantially restored to its original shape, increasing the volume of the starting material storing portion 21. At this point, the starting material 6 is acted upon by the pressure toward the ejection portion 23 from the feeder 4 (pressure in the forward direction). Accordingly, the entrance of air into the starting material storing portion 21 from the ejection portion 23 is prevented, making it possible to supply the starting material 6 into the starting material storing portion 1 from the feeder 4 in an amount corresponding to the predetermined ejected amount of the starting material 6.

By making the above voltage application at a predetermined period, the piezoelectric element 22 vibrates to cause the particulate starting material 6 to be repeatedly ejected.

Thus, the invention is characterized in that the starting material having a fluidity is ejected in particulate form with the vibration of the piezoelectric material and then solidified to obtain a toner.

As a process for producing a toner from a starting material having a fluidity there has been heretofore known a spray drying process. The spray drying process includes spraying a starting material dissolved in a solvent for producing a toner with a high pressure gas to obtain a finely divided powder as a toner. However, this spray drying process had the following problems.

In other words, the spray drying process involves the use of a high pressure gas to spray the starting material and thus can difficultly control the spray conditions accurately. Therefore, the spray drying process can difficultly make an efficient production of a particulate toner having a desired shape and size. Further, in the spray drying process, the dispersion of the size of the particles produced by spraying is great (the width of the particle size distribution is great), making the dispersion of the moving velocity of the particles great. Therefore, before the solidification of the starting material sprayed, collision of the particles sprayed and agglomeration of the particles occur to produce an odd-shaped powder. Thus, the dispersion of the shape and size of the finally obtained toner particles is occasionally further raised. Thus, the toner obtained by the spray drying process has a great dispersion of shape and size of particles and hence a great dispersion of chargeability and fixability of particles and a low reliability as a whole.

On the contrary, in the invention, the starting material is intermittently ejected one droplet by one droplet with a pressure pulse generated by the vibration of a piezoelectric material, making it possible to obtain a toner having a stable shape and making it relatively easy to render the particulate toner thus produced highly spherical (close to geometrically complete sphere).

Further, in the invention, the frequency of the piezoelectric material, the opening area of the ejection portion (nozzle diameter), the temperature and viscosity of the starting material, the ejected amount of starting material by one droplet, etc. can be controlled relatively accurately, making it easy to control the shape and size of the toner to be produced to desired values.

In the invention, the vibration of the piezoelectric material is employed, making it possible to eject the starting material at a predetermined interval of time. Therefore, the particles of starting material thus ejected can be effectively prevented from colliding with each other and being agglomerated, making it difficult to form an odd-shaped powder as compared with the use of the spray drying method.

Further, by controlling the ejected amount of starting material by one droplet, the frequency of the piezoelectric material, etc., the produced amount of toner, etc. can be easily and certainly controlled.

In the invention, the initial velocity of the starting material 6 ejected from the head portion 2 into the solidifying portion 3 is preferably from 0. 1 to 10 m/sec, from 2 to 8 m/sec. When the initial velocity of the starting material 6 falls below the above defined lower limit, the producibility of toner is lowered. On the other hand, when the initial velocity of the starting material 6 exceeds the above defined upper limit, a tendency is given that the sphericity of the particulate toner 9 is reduced.

The viscosity of the starting material 6 ejected from the head portion 2 is not specifically limited but is preferably from 1 to 1,000 cps, more preferably from 1 to 300 cps. When the viscosity of the starting material 6 falls below the above defined lower limit, it is made difficult to control thoroughly the size of the particles (particulate starting material 6) ejected, occasionally increasing the dispersion of size of the toner particles 9 thus obtained. On the contrary, when the viscosity of the starting material 6 exceeds the above defined upper limit, the resulting particulate material has an increased diameter giving a tendency that the ejection speed of the starting material 6 is lowered and the energy consumed for the ejection of starting material is increased. Further, the starting material 6 having a drastically increased viscosity cannot be ejected in the form of droplet.

The ejected amount of the starting material 6 by one droplet is not specifically limited but is preferably from 0.05 to 500 pl, more preferably from 0.1 to 50 pl. By predetermining the ejected amount of the starting material 6 by one droplet to be within the above defined range, the finally obtained particulate toner 9 can be provided with a proper particle diameter.

The frequency of the piezoelectric element 22 is not specifically limited but is preferably from 10 kHz to 500 MHz, more preferably from 20 kHz to 200 MHz. When the frequency of the piezoelectric element 22 falls below the above defined lower limit, the productivity of toner is lowered. On the contrary, when the frequency of the piezoelectric element 22 exceeds the above defined upper limit, the ejection of the particulate starting material 6 cannot be followed, causing the size of one droplet of the starting material 6 to be dispersed drastically.

The toner producing apparatus 1 having a shown structure has a plurality of head portions 2. From these head portions 2 are each ejected the particulate starting material 6 into the solidifying portion 3.

The head portions 2 may be arranged to eject the starting material 6 at almost the same time. However, it is preferably controlled such that at least two adjacent head portions ejected the starting material 6 at different timings. In this arrangement, the particles of the starting material 6 ejected from the adjacent head portions 2 can be more effectively prevented from colliding with each other or being agglomerated before being solidified.

As shown in FIG. 1, the toner producing apparatus 1 has a gas flow supplying unit 10. The gas flow supplying unit 10 is arranged such that a gas supplied therefrom is injected at almost uniform pressure from gas injection nozzles 7 provided between the head portions 2 through a duct 101. In this manner, the particulate starting material 6 which has been intermittently ejected from the ejection portion 23 can be solidified while being conveyed at a controlled interval. As a result, the collision and agglomeration of the particulate starting material 6 thus ejected can be more effectively prevented.

Further, by injecting the gas supplied from the gas flow supplying unit 10 from the gas injection nozzle 7, a gas flow can be formed in substantially one direction (downward as viewed in the drawing) in the solidifying portion 3. When such a gas flow is formed, the particulate starting material 6 (particulate toner 9) can be more efficiently conveyed in the solidifying portion 3.

Further, when a gas is injected from the gas injection nozzle 7, an air flow curtain is formed between the particles ejected from the head portions 2, making it possible to more effectively prevent the collision and agglomeration of the particles ejected from the adjacent head portions.

The gas flow supplying unit 10 is also provided with a heat exchanger 11. In this arrangement, the temperature of the gas injected from the gas injection nozzle 8 can be predetermined to be a desired value. In other words, when the starting material 6 is in the form of solution, a gas having a relatively high temperature can be injected. On the contrary, when the starting material 6 is in molten form, a gas having a relatively low temperature can be injected. As a result, the particulate starting material 6 which has been ejected into the solidifying portion 3 can be efficiently solidified.

When there is provided such a gas flow supplying unit 10, the solidifying rate of the starting material 6 ejected from the ejection portion 23, etc. can be easily controlled, e.g., by adjusting the supplied amount of gas flow.

The temperature of the gas injected from the gas injection nozzle 7 depends on the composition of the resin and solvent contained in the starting material 6, etc. but preferably falls within the following range.

In other words, when the starting material 6 is molten state, the temperature of the gas injected from the gas injection nozzle 7 is preferably from 50° C. to 350° C., more preferably from 100° C. to 300° C. In this arrangement, the solvent can be efficiently removed from the starting material 6 while keeping the shape of the particulate toner 9 thus obtained uniform, making it possible to further enhance the productivity of toner.

In the case where the starting material 6 is in molten state, the temperature of the gas ejected from the gas injection nozzle 7 is preferably from 0° C. to 100° C., more preferably from 5° C. to 50° C. In this arrangement, the particulate starting material 6 can be cooled and solidified while keeping the shape of the particulate toner 9 thus obtained uniform, making it possible to further enhance the productivity of toner.

The particulate starting material 6 ejected from the head portion 2 is solidified while being conveyed in the solidifying portion 3 to form a particulate toner 9.

The solidifying portion 3 is formed by a cylindrical housing 31.

The particulate starting material 6 may be solidified with the gas injected from the gas injection nozzle 7 or may be solidified by other means. For example, a heat source or cooling source disposed inside or outside the housing 31 may be used to solidify the starting material 6. Alternatively, the housing 31 may be a jacket having a heat medium or cooling medium path formed therein. In the case where the starting material 6 ejected from the head portion 2 is the form of solution, the interior of the housing 31 is put under reduced pressure to remove the solvent from the starting material 6, thereby obtaining a solidified particulate toner 9.

The process for the production of the particulate toner 9 is not limited to the above process involving the removal of the solvent from the starting material 6 in the form of solution or the cooling and solidification of the molten starting material 6. For example, in the case where the starting material 6 contains a resin material precursor (e.g., monomer, dimer and oligomer corresponding to the above resin material), the particulate toner 9 may be obtained by a process involving the progress of polymerization reaction in the solidifying portion 3.

To the housing 31 is connected a voltage applying unit 8 for applying a voltage to the housing 31. By allowing the voltage applying unit 8 to apply a voltage having the same polarity as that of the particulate starting material 6 (particulate toner 9) to the inner surface of the housing 31, the following effects can be obtained.

In general, a particulate toner is positively or negatively charged. Therefore, when there are materials charged with a polarity different from the particulate toner, a phenomenon occurs that the particulate toner is electrostatically attracted to the charged materials. On the contrary, when there are materials charged with the same polarity as that of the particulate toner, the charged materials and the particulate toner repel each other, making it possible to effectively prevent the above phenomenon that the toner is attracted to the charged materials. Accordingly, by applying a voltage having the same polarity as that of the particulate starting material 6 (particulate toner 9) to the inner surface of the housing 31, the attraction of the starting material 6 (particulate toner 9) to the inner surface of the housing 31 can be effectively prevented. In this arrangement, the production of an odd-shaped particulate toner can be effectively prevented and the efficiency of recovery of the particulate toner 9 can be enhanced.

The housing 31 has a reduced diameter portion 311 the inner diameter of which decreases downward as viewed in FIG. 1 in the vicinity of the recovery portion 5. The provision of the reduced diameter portion 311 makes it possible to efficiently recover the particulate toner 9. As previously mentioned, the starting material 6 ejected from the ejection portion 23 is solidified in the solidifying portion 3. The solidification of the starting material 6 is almost fully completed in the vicinity of the recovery portion 5. Thus, even when the particles come in contact with each other in the vicinity of the reduced diameter portion 311, problems such as agglomeration occur little.

The particulate toner 9 obtained by the solidification of the particulate starting material 6 is then recovered by the recovery portion 5.

The toner thus obtained may be optionally subjected to various treatments such as classification and external addition.

The classification may be accomplished by the use of sieve, air classifier or the like.

Examples of the external additives to be used in external addition include particulate material of inorganic material such as metal oxide (e.g., silica, aluminum oxide, titanium oxide, strontium titanate, cerium oxide, magnesium oxide, chromium oxide, titania, zinc oxide, alumina, magnetite), nitride (e.g., silicon nitride) and metal salt (e.g., calcium sulfate, calcium carbonate, metal salt of aliphatic acid), organic material (e.g., acrylic resin, fluororesin, polystyrene resin, polyester resin, metal salt of aliphatic acid) and composite thereof.

Alternatively, as the external additives there may be used those obtained by subjecting the particulate materials to surface treatment with HMDS, silane-based coupling agent, titanate-based coupling agent, fluorine-containing silane-based coupling agent, silicone oil or the like.

The toner of the invention thus produced has a uniform shape and a sharp particle size distribution. In particular, in the invention, a particulate toner having a substantially spherical form can be obtained.

In some detail, the toner (particulate toner) preferably has an average circularity R of not smaller than 0.95, more preferably not smaller than 0.97, even more preferably not smaller than 0.98 as represented by the following equation (I). When the average circularity R is not smaller than 0.95, the transfer efficiency of toner can be further enhanced.

$$R=L_0/L_1 \quad (I)$$

wherein $L_1$ [μm] represents the peripheral length of the projected image of the toner particle to be measured; and $L_0$ represents the peripheral length of the true circle having the same area as that of the projected image of the toner particle to be measured.

The toner is preferably arranged such that the standard deviation of particle diameter of particles is not greater than 1.5 μm, more preferably not greater than 1.0 μm. When the standard deviation of particle diameter of particles is not greater than 1.5 μm, the dispersion of chargeability, fixability, etc. can be drastically reduced, thereby further enhancing the reliability of the toner as a whole.

The average particle diameter of the toner thus obtained on a weight basis is preferably from 2 μm to 20 μm, more preferably from 4 μm to 10 μm. When the average particle diameter of the toner falls below the above defined lower limit, the toner particles cannot be uniformly charged and have a raised attractive force to the surface of an electrostatic latent image carrier (e.g., photoreceptor), occasionally increasing the amount of the toner left untransferred. On the contrary, when the average particle diameter of the toner exceeds the above defined upper limit, the reproducibility of image formed by the toner at its contour, particularly in the development of letter image or light pattern, is lowered.

While the apparatus and process for producing a toner and the toner according to the first embodiment have been described, the invention is not limited thereto.

Figure 3:
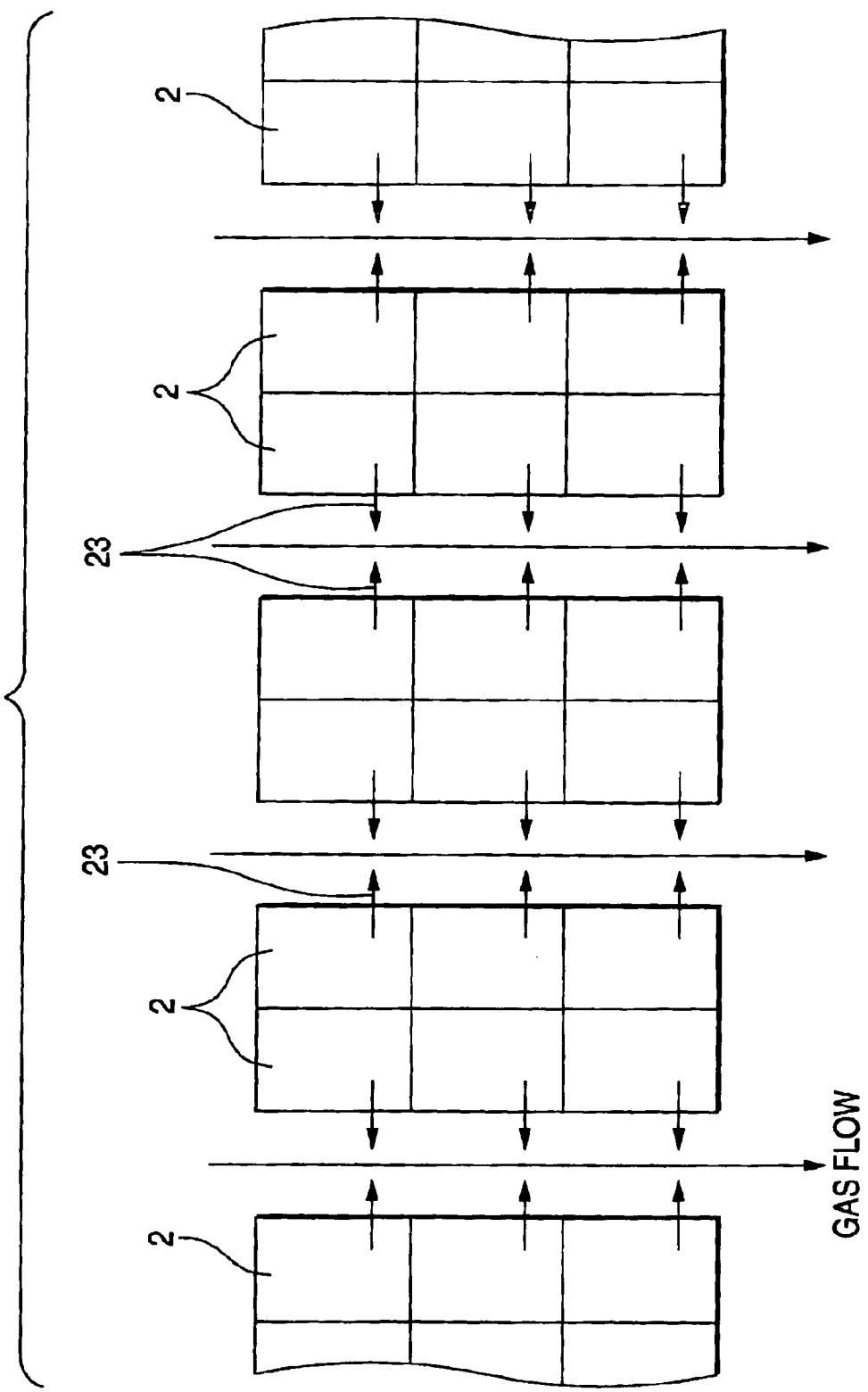
FIG. 3 is a schematic diagram of the structure in the vicinity of an apparatus for producing a toner according to a second embodiment of the invention.

For example, the various parts constituting the apparatus for producing a toner according to the invention may be replaced by any other parts having the same function or may further have other constitutions. While the first embodiment have been described with reference to the structure arranged to eject the particulate starting material in the downward and vertical direction, the direction of ejection of starting material may be any of upward and vertical direction, horizontal direction, etc. Alternatively, as shown in FIG. 3, the direction of ejection of starting material 6 and the direction of injection of gas from the gas injection nozzle 7 may be substantially perpendicular to each other in the apparatus according to the second embodiment. In this case, the particulate starting material 6 thus ejected changes its moving direction when acted upon by the gas flow. Thus, the particulate starting material 6 is conveyed substantially perpendicular to the direction of ejection from the ejection portion 23.

EXAMPLE

[1] Production of Toner

Example 1

A resin solution A and a dispersion B were prepared.

<Resin Solution A>

98 parts by weight of a polyester resin (acid value: 26.2 KOHmg/g; hydroxyl number: 12.2 KOHmg/g; glass transition temperature: 62° C.; descending flow tester softening temperature: 104.8° C.), 6 parts by weight of a quinacridone-based pigment and 100 parts by weight of methyl ethyl ketone were put in a sealable vessel equipped with an agitating blade. The agitating blade was then rotated to obtain a resin solution A.

<Dispersion B>

2 parts by weight of zinc salt of salicylic acid, 3 parts by weight of a carnauba wax, 2 parts by weight of a polyester resin and 300 parts by weight of methyl ethyl ketone were put in a sealable vessel with zirconia beads where they were then subjected to ball mill dispersion for 1 hour to obtain a dispersion B.

To the resin solution A thus prepared was then added the dispersion B thus prepared. The mixture was then stirred for 10 minutes to obtain a uniform magenta solution (dispersion) as a starting material of toner. The starting material thus obtained had a viscosity of 182 cps.

The starting material thus obtained was then put in the feeder of the toner producing apparatus shown in FIGS. 1 and 2. The starting material received in the feeder was then supplied into the starting material storing portion of the head portion by a metering pump. The starting material was then ejected from the ejection portion into the solidifying portion. The ejection portion was in a circular form having a diameter of 25 µm.

The ejection of the starting material was effected under the conditions that the temperature of the starting material in the head portion is 25° C., the frequency of the piezoelectric material is 30 kHz, the initial velocity of the starting material ejected from the ejection portion is 3.5 m/sec and the amount of the starting material ejected from the head portion by one droplet is adjusted to 4 pl. The ejection of the starting material was also effected in such a manner that at least adjacent head portions among a plurality of head portions eject the starting material at different timings.

During the ejection of the starting material, air having a temperature of 100° C. was injected downward vertically from the gas injection nozzles at a flow rate of 3 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.985 and a standard circularity deviation of 0.007. The particulate material had a weight-average particle diameter of 8.6 µm. The standard deviation of weight-average particle diameter was 1.2. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \quad (I)$$

wherein $L_1$ [µm] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 8.7 µm.

Example 2

A liquid starting material having 6 parts by weight of a quinacridone-based pigment and 2 parts by weight of zinc salt of salicylic acid dispersed in 100 parts by weight of a molten polyolefin resin was obtained. The starting material thus obtained had a viscosity of 210 cps at 120° C.

The starting material thus obtained was then put in the feeder of the toner producing apparatus shown in FIGS. 1 and 2. The starting material received in the feeder was then supplied into the starting material storing portion of the head portion by a metering pump. The starting material was then ejected from the ejection portion into the solidifying portion. The ejection portion was in a circular form having a diameter of 25 µm.

The ejection of the starting material was effected under the conditions that the temperature of the starting material in the head portion is 120° C., the frequency of the piezoelectric material is 1 MHz, the initial velocity of the starting material ejected from the ejection portion is 3 m/sec and the amount of the starting material ejected from the head portion by one droplet is adjusted to 2 pl. The ejection of the starting material was also effected in such a manner that at least adjacent head portions among a plurality of head portions eject the starting material at different timings.

During the ejection of the starting material, air having a temperature of 10° C. was injected downward vertically from the gas injection nozzles at a flow rate of 3 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.992 and a standard circularity deviation of 0.006. The particulate material had a weight-average particle diameter of 8.9 µm. The standard deviation of weight-average particle diameter was 1.1. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \quad (I)$$

wherein $L_1$ [µm] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 9.0 µm.

[2] Evaluation

The various toners thus obtained were each then evaluated for average circularity of toner particles, transfer efficiency, fixing temperature range, durability and fogging.

[2. 1] Average Circularity of Toner Particles

The toners produced in the various examples and comparative examples were each measured for average circularity R. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \quad (I)$$

wherein $L_1$ [µm] represents the peripheral length of the projected image of the toner particle to be measured; and $L_0$ represents the peripheral length of the true circle having the same area as that of the projected image of the toner particle to be measured.

[2. 2] Measurement of Transfer Efficiency

Using a Type LP-2000C color laser printer (produced by SEIKO EPSON CORPORATION), the transfer efficiency of the toners produced in the above various examples were evaluated in the following manner.

The toner on the photoreceptor which had been subjected to development (before transfer) and the toner on the photoreceptor after transfer (after printing) were sampled with separate tapes, and then each measured for weight. The value obtained by (Wb−Wa)×100/Wb was defined to be transfer efficiency supposing that Wb [g] is the weight of the toner on the photoreceptor before transfer and Wa [g] is the weight of the toner on the photoreceptor after transfer.

[2. 3] Durability

The toners obtained in the above various examples and the above various comparative examples were each packed in the cartridge of a Type LP-2000C color laser printer (produced by SEIKO EPSON CORPORATION). These cartridges were each then subjected to running over 5,000 sheets of paper. The image on the 4901st to 5000th printed matters were each then evaluated according to the following four-step criterion:

E (excellent): No streak or disturbance observed on image;

G (good): Little or no streak or disturbance observed on image;

F (fail): Some streak or disturbance observed on image;

P (poor): Definite streak or disturbance observed on image

These results are set forth in Table 1 below with the results of standard deviation of circularity of toner particles, average particle diameter of toner particles (on a weight basis) and standard deviation of particles diameters.

TABLE 1

| | Average circularity | Standard deviation of circularity | Average particle diameter [μm] | Standard deviation of particle diameter [μm] | Transfer efficiency [%] | Evaluation of dirability |
|---|---|---|---|---|---|---|
| Example 1 | 0.985 | 0.007 | 8.6 | 1.2 | 99.2 | E |
| Example 2 | 0.992 | 0.006 | 9.0 | 1.1 | 99.6 | E |

As can be seen in Table 1, the toners of the invention have a great circularity and a sharp particle size distribution. Further, all the toners of the invention are excellent in transfer efficiency and durability and have no problems with image density, background stain, transfer and fixing. Thus, printed matters having a sharpness in the vicinity of printed area and little density unevenness were obtained.

In the case where a spray drying process is employed, even if various conditions such as gas injection pressure and starting material temperature are predetermined optimum, the resulting particulate toner normally has a circularity of about 0.97, a standard circularity deviation of about 0.04 and a standard particle diameter deviation of about 2.7 μm.

Toners were prepared in the same manner as in the various examples except that as the coloring agents there were used C. I. pigment blue 15:3, C. I. pigment yellow 93 and carbon black instead of quinacridone-based pigment, respectively. These toners were each then evaluated in the same manner as mentioned above. The results were similar to that of the above various examples.

Next, the apparatus 1 for the production of a toner according to the third embodiment will be described below in detail referring to FIGS. 1 and 4. The apparatus 1 of this embodiment is identical to the apparatus 1 of the first embodiment except for a configuration of a head portion 2.

The head portion 2 has a starting material storing portion 21 for storing the starting material 6, a piezoelectric element 22 for generating a pressure pulse, an acoustic lens (concave lens) 23 for converging the pressure pulse, and an ejection portion 123 for ejecting the starting material 6 with the pressure pulse thus converged.

The starting material storing portion 21 stores a starting material 6 having a fluidity. The starting material 6 may be in the form of solution having at least part of the components dissolved in a solvent (hereinafter referred simply to as "solution state") or may be molten in at least part of the components thereof (hereinafter referred simply to as "molten state").

The piezoelectric element 22 includes a lower electrode (first electrode) 221, a piezoelectric material 222 and an upper electrode (second electrode) 223 laminated in this order. The piezoelectric element 22 performs as follows.

The piezoelectric material 222 shows no deformation when no predetermined ejection signal from a piezoelectric element driving circuit (not shown) is inputted thereto, i.e., when no voltage is applied across the lower electrode 221 and the upper electrode 223 of the piezoelectric element 22. On the contrary, when a predetermined ejection signal from the piezoelectric element driving circuit is inputted to the piezoelectric element 22, i.e., when a predetermined voltage is applied across the lower electrode 221 and the upper electrode 223 of the piezoelectric element 22, the piezoelectric material 222 shows some deformation, generating a pressure pulse (vibration energy). Therefore, the piezoelectric element 22 acts as a vibration source and thus is a pressure pulse source.

The pressure pulse (vibration energy) generated by the piezoelectric element 22 is transmitted to the acoustic lens 26 by which it is then converged at a pressure pulse converging portion 25.

The starting material 6 in the starting material storing portion 21 is ejected from the ejection portion 123 into the solidifying portion 3 by the pressure pulse thus converged.

By making the voltage application at a predetermined period, the piezoelectric element 22 vibrates to cause the particulate starting material 6 to be repeatedly ejected.

Thus, the third embodiment is characterized in that the starting material having a fluidity is ejected with a pressure pulse (vibration energy) which has been generated by a piezoelectric element and then converged by an acoustic lens.

In the embodiment, the starting material is intermittently ejected one droplet by one droplet with a pressure pulse generated by the vibration of a piezoelectric material, making it possible to obtain a toner having a stable shape and making it relatively easy to render the particulate toner thus produced highly spherical (close to geometrically complete sphere).

In particular, the third embodiment of the invention involves the use of a pressure pulse converged by the acoustic lens 26 to eject the starting material 6 and thus can make an efficient utilization of a vibration energy from the piezoelectric element 22 as an energy for ejecting the starting material 6. As a result, the starting material 6 stored in the starting material storing portion 21, even if it has a relatively high viscosity, can be certainly ejected from the ejection portion 123. Further, the starting material 6 stored in the starting material storing portion 21, even if it has a relatively high cohesive force (surface tension), can be ejected in the form of particulate droplet, making it possible to easily and certainly control the particle diameter of the resulting particulate toner 9 to a relatively small value.

Thus, the third embodiment allows the use of a material having a relatively high viscosity or cohesive force as the starting material 6, drastically increasing the degree of selection of materials and hence making it easy to obtain a toner having desired properties.

In the embodiment, the frequency of the piezoelectric material, the aperture and focal length of the acoustic lens, the temperature and viscosity of the material, the ejected amount of the starting material by one droplet, etc. can be relatively accurately controlled, making it easy to control the shape and size of the resulting toner to be desired values.

In the third embodiment, the vibration of the piezoelectric material is employed, making it possible to eject the starting material at a predetermined interval of time. Therefore, the particles of starting material thus ejected can be effectively prevented from colliding with each other and being agglomerated, making it difficult to form an odd-shaped powder as compared with the use of the spray drying method.

Further, by controlling the ejected amount of starting material by one droplet, the frequency of the piezoelectric material, etc., the produced amount of toner, etc. can be easily and certainly controlled.

In the third embodiment, the frequency of the piezoelectric element 22 is not specifically limited but is preferably from 10 kHz to 500 MHz, more preferably from 20 kHz to 200 MHz. When the frequency of the piezoelectric element 22 falls below the above defined lower limit, the productivity of toner is lowered. On the contrary, when the frequency of the piezoelectric element 22 exceeds the above defined upper limit, the ejection of the particulate starting material 6 cannot be followed, causing the size of one droplet of the starting material 6 to be dispersed drastically.

In the structure shown, the acoustic lens 26 is disposed such that a focal point is formed in the vicinity of the ejection portion 123 (in the vicinity of the liquid level of the starting material 6 stored in the starting material 21). In this arrangement, the vibration energy from the piezoelectric element 22 can be more efficiently utilized as an energy for ejecting the starting material 6. As a result, the starting material 6 stored in the starting material storing portion 21, even if it has a relatively high viscosity, can be certainly ejected from the ejection portion 123.

The shape of the ejection portion 123 is not specifically limited but is preferably substantially circular. In this arrangement, the sphericity of the starting material 6 and the particulate toner 9 thus ejected can be enhanced.

Further, in the third embodiment, even when the area of the ejection portion 123 (opening area) is relatively great, the size of the starting material 6 to be ejected can be relatively small to allow itself to be ejected with a pressure pulse thus converged. In other words, even when it is desired to predetermine the particle diameter of the finally obtained particulate toner 9 to be relatively small, the area of the ejection portion 123 can be raised. Thus, even when the starting material 6 has a relatively high viscosity, the occurrence of clogging in the ejection portion 123 can be more effectively prevented.

The diameter (nozzle diameter) of the ejection portion 123, if it is substantially circular, is preferably from 5 to 500 $\mu$m, more preferably from 10 to 200 $\mu$m. When the diameter of the ejection portion 123 falls below the above defined lower limit, clogging can easily occur, occasionally raising the dispersion of the size of the starting material 6 thus ejected. On the contrary, when the diameter of the ejection portion 123 exceeds the above defined upper, some relationships between the negative pressure in the starting material storing portion 21 and the surface tension of the nozzle can cause the starting material 6 thus ejected to surround air bubbles.

The initial velocity of the starting material 6 ejected from the head portion 2 into the solidifying portion 3 is preferably from 0.1 to 10 m/sec, from 2 to 8 m/sec. When the initial velocity of the starting material 6 falls below the above defined lower limit, the producibility of toner is lowered. On the other hand, when the initial velocity of the starting material 6 exceeds the above defined upper limit, a tendency is given that the sphericity of the particulate toner 9 is reduced.

The viscosity of the starting material 6 ejected from the head portion 2 is not specifically limited but is preferably from 1 to 1,000 cps, more preferably from 1 to 300 cps. When the viscosity of the starting material 6 falls below the above defined lower limit, it is made difficult to control thoroughly the size of the particles (particulate starting material 6) ejected, occasionally increasing the dispersion of size of the toner particles 9 thus obtained. On the contrary, when the viscosity of the starting material 6 exceeds the above defined upper limit, the resulting particulate material has an increased diameter giving a tendency that the ejection speed of the starting material 6 is lowered and the energy consumed for the ejection of starting material is increased. Further, the starting material 6 having a drastically increased viscosity cannot be ejected in the form of droplet.

The ejected amount of the starting material 6 by one droplet is not specifically limited but is preferably from 0.05 to 500 pl, more preferably from 0.1 to 50 pl. By predetermining the ejected amount of the starting material 6 by one droplet to be within the above defined range, the finally obtained particulate toner 9 can be provided with a proper particle diameter.

The toner producing apparatus 1 having a shown structure has a plurality of head portions 2. From these head portions 2 are each ejected the particulate starting material 6 into the solidifying portion 3.

The head portions 2 may be arranged to eject the starting material 6 at almost the same time. However, it is preferably controlled such that at least two adjacent head portions ejected the starting material 6 at different timings. In this arrangement, the particles of the starting material 6 ejected from the adjacent head portions 2 can be more effectively prevented from colliding with each other or being agglomerated before being solidified.

Figure 4:
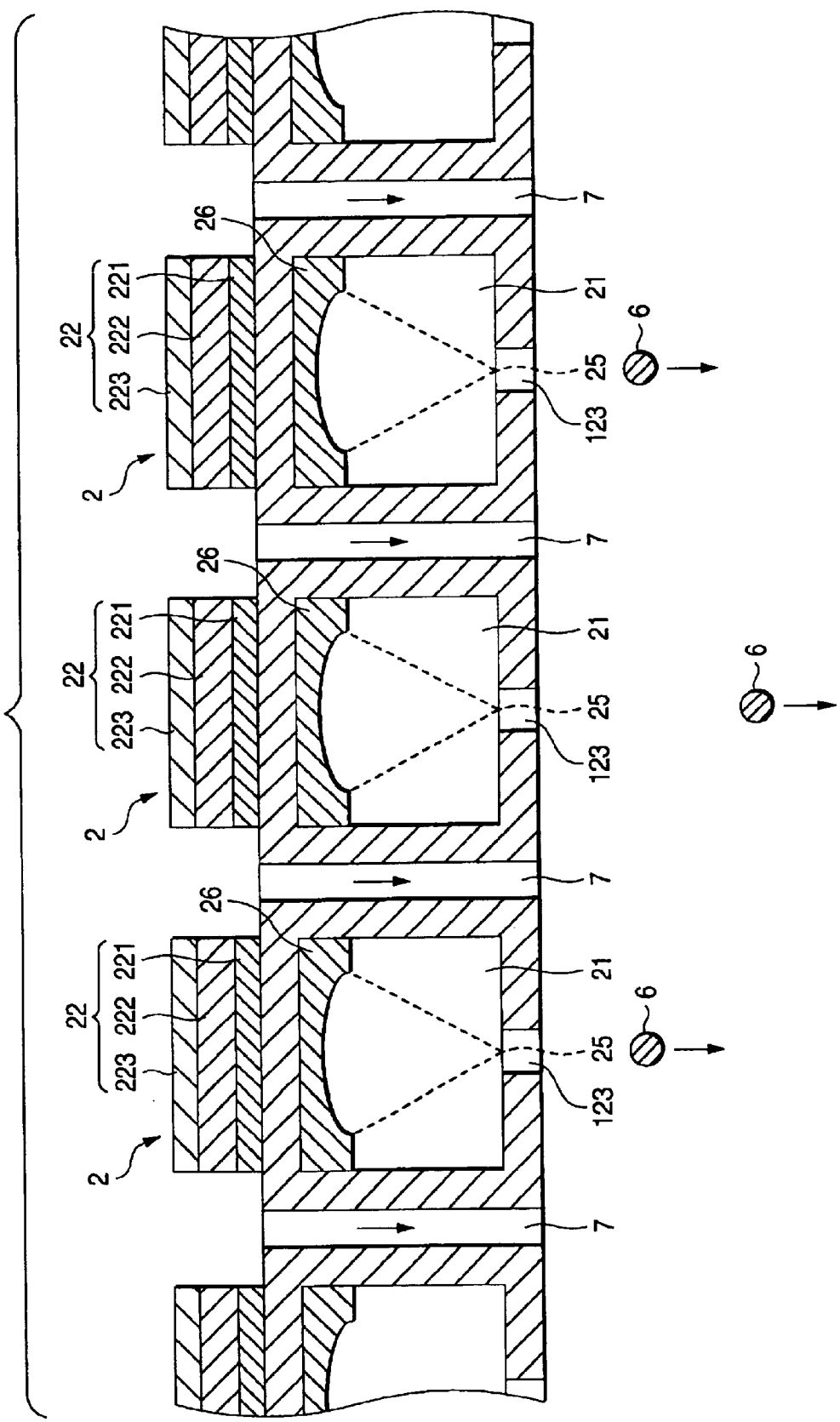
FIG. 4 is an enlarged sectional view of a part in the vicinity of the head portion of the apparatus for the production of a toner of FIG. 1 according to a third embodiment of the invention.

As shown in FIG. 4, the toner producing apparatus 1 has a gas flow supplying unit 10. The gas flow supplying unit 10 is arranged such that a gas supplied therefrom is injected at almost uniform pressure from gas injection nozzles 7 provided between the head portions 2 through a duct 101. In this manner, the particulate starting material 6 which has been intermittently ejected from the ejection portion 123 can be solidified while being conveyed at a controlled interval. As a result, the collision and agglomeration of the particulate starting material 6 thus ejected can be more effectively prevented.

Further, by injecting the gas supplied from the gas flow supplying unit 10 from the gas injection nozzle 7, a gas flow can be formed in substantially one direction (downward as viewed in the drawing) in the solidifying portion 3. When such a gas flow is formed, the particulate starting material 6 (particulate toner 9) can be more efficiently conveyed in the solidifying portion 3.

Further, when a gas is injected from the gas injection nozzle 7, an air flow curtain is formed between the particles ejected from the head portions 2, making it possible to more effectively prevent the collision and agglomeration of the particles ejected from the adjacent head portions.

The gas flow supplying unit 10 is also provided with a heat exchanger 11. In this arrangement, the temperature of the gas injected from the gas injection nozzle 8 can be predetermined to be a desired value. In other words, when the starting material 6 is in the form of solution, a gas having a relatively high temperature can be injected. On the contrary, when the starting material 6 is in molten form, a gas having a relatively low temperature can be injected. As a result, the particulate starting material 6 which has been ejected into the solidifying portion 3 can be efficiently solidified.

When there is provided such a gas flow supplying unit 10, the solidifying rate of the starting material 6 ejected from the ejection portion 123, etc. can be easily controlled, e.g., by adjusting the supplied amount of gas flow.

The temperature of the gas injected from the gas injection nozzle 7 depends on the composition of the resin and solvent contained in the starting material 6, etc. but preferably falls within the following range.

In other words, when the starting material 6 is molten state, the temperature of the gas injected from the gas injection nozzle 7 is preferably from 50° C. to 350° C., more preferably from 100° C. to 300° C. In this arrangement, the solvent can be efficiently removed from the starting material 6 while keeping the shape of the particulate toner 9 thus obtained uniform, making it possible to further enhance the productivity of toner.

In the case where the starting material 6 is in molten state, the temperature of the gas ejected from the gas injection nozzle 7 is preferably from 0° C. to 100° C., more preferably from 5° C. to 50° C. In this arrangement, the particulate starting material 6 can be cooled and solidified while keeping the shape of the particulate toner 9 thus obtained uniform, making it possible to further enhance the productivity of toner.

The particulate starting material 6 ejected from the head portion 2 is solidified while being conveyed in the solidifying portion 3 to form a particulate toner 9.

The solidifying portion 3 is formed by a cylindrical housing 31.

The particulate starting material 6 may be solidified with the gas injected from the gas injection nozzle 7 or may be solidified by other means. For example, a heat source or cooling source disposed inside or outside the housing 31 may be used to solidify the starting material 6. Alternatively, the housing 31 may be a jacket having a heat medium or cooling medium path formed therein. In the case where the starting material 6 ejected from the head portion 2 is the form of solution, the interior of the housing 31 is put under reduced pressure to remove the solvent from the starting material 6, thereby obtaining a solidified particulate toner 9.

The process for the production of the particulate toner 9 is not limited to the above process involving the removal of the solvent from the starting material 6 in the form of solution or the cooling and solidification of the molten starting material 6. For example, in the case where the starting material 6 contains a resin material precursor (e.g., monomer, dimer and oligomer corresponding to the above resin material), the particulate toner 9 may be obtained by a process involving the progress of polymerization reaction in the solidifying portion 3.

To the housing 31 is connected a voltage applying unit 8 for applying a voltage to the housing 31. By allowing the voltage applying unit 8 to apply a voltage having the same polarity as that of the particulate starting material 6 (particulate toner 9) to the inner surface of the housing 31, the following effects can be obtained.

In general, a particulate toner is positively or negatively charged. Therefore, when there are materials charged with a polarity different from the particulate toner, a phenomenon occurs that the particulate toner is electrostatically attracted to the charged materials. On the contrary, when there are materials charged with the same polarity as that of the particulate toner, the charged materials and the particulate toner repel each other, making it possible to effectively prevent the above phenomenon that the toner is attracted to the charged materials. Accordingly, by applying a voltage having the same polarity as that of the particulate starting material 6 (particulate toner 9) to the inner surface of the housing 31, the attraction of the starting material 6 (particulate toner 9) to the inner surface of the housing 31 can be effectively prevented. In this arrangement, the production of an odd-shaped particulate toner can be effectively prevented and the efficiency of recovery of the particulate toner 9 can be enhanced.

The housing 31 has a reduced diameter portion 311 the inner diameter of which decreases downward as viewed in FIG. 1 in the vicinity of the recovery portion 5. The provision of the reduced diameter portion 311 makes it possible to efficiently recover the particulate toner 9. As previously mentioned, the starting material 6 ejected from the ejection portion 123 is solidified in the solidifying portion 3. The solidification of the starting material 6 is almost fully completed in the vicinity of the recovery portion 5. Thus, even when the particles come in contact with each other in the vicinity of the reduced diameter portion 311, problems such as agglomeration occur little.

The particulate toner 9 obtained by the solidification of the particulate starting material 6 is then recovered by the recovery portion 5.

The toner thus obtained may be optionally subjected to various treatments such as classification and external addition.

The classification may be accomplished by the use of sieve, air classifier or the like.

Examples of the external additives to be used in external addition include particulate material of inorganic material such as metal oxide (e.g., silica, aluminum oxide, titanium oxide, strontium titanate, cerium oxide, magnesium oxide, chromium oxide, titania, zinc oxide, alumina, magnetite), nitride (e.g., silicon nitride) and metal salt (e.g., calcium sulfate, calcium carbonate, metal salt of aliphatic acid), organic material (e.g., acrylic resin, fluororesin, polystyrene resin, polyester resin, metal salt of aliphatic acid) and composite thereof.

Alternatively, as the external additives there may be used those obtained by subjecting the particulate materials to surface treatment with HMDS, silane-based coupling agent, titanate-based coupling agent, fluorine-containing silane-based coupling agent, silicone oil or the like.

The toner of the invention thus produced has a uniform shape and a sharp particle size distribution. In particular, in the invention, a particulate toner having a substantially spherical form can be obtained.

In some detail, the toner (particulate toner) preferably has an average circularity R of not smaller than 0.95, more preferably not smaller than 0.97, even more preferably not smaller than 0.98 as represented by the following equation (I). When the average circularity R is not smaller than 0.95, the transfer efficiency of toner can be further enhanced.

$$R=L_0/L_1 \quad (I)$$

wherein $L_1$ [μm] represents the peripheral length of the projected image of the toner particle to be measured; and $L_0$ represents the peripheral length of the true circle having the same area as that of the projected image of the toner particle to be measured.

The toner is preferably arranged such that the standard deviation of particle diameter of particles is not greater than 1.5 μm, more preferably not greater than 1.0 μm. When the standard deviation of particle diameter of particles is not greater than 1.5 μm, the dispersion of chargeability, fixability, etc. can be drastically reduced, thereby further enhancing the reliability of the toner as a whole.

The average particle diameter of the toner thus obtained on a weight basis is preferably from 2 μm to 20 μm, more preferably from 4 μm to 10 μm. When the average particle diameter of the toner falls below the above defined lower limit, the toner particles cannot be uniformly charged and have a raised attractive force to the surface of an electrostatic latent image carrier (e.g., photoreceptor), occasionally increasing the amount of the toner left untransferred. On the contrary, when the average particle diameter of the toner exceeds the above defined upper limit, the reproducibility of image formed by the toner at its contour, particularly in the development of letter image or light pattern, is lowered.

Figure 8:
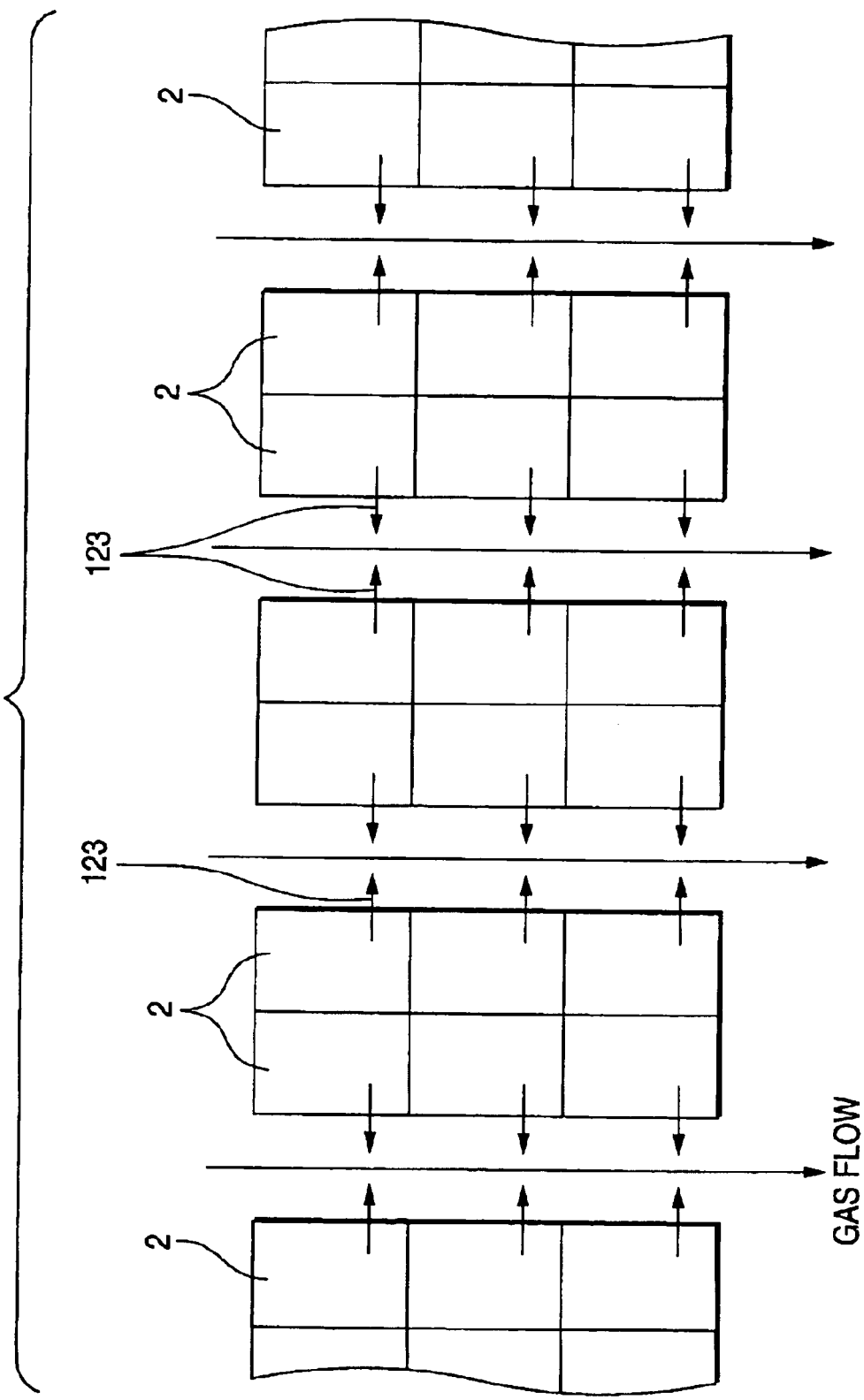
FIG. 8 is a schematic diagram of the structure in the vicinity of an apparatus for the production of a toner according to a seventh embodiment of the invention.

For example, the various parts constituting the apparatus for producing a toner according to the embodiments may be replaced by any other parts having the same function or may further have other constitutions. While the above embodiments have been described with reference to the structure arranged to eject the particulate starting material in the downward and vertical direction, the direction of ejection of starting material may be any of upward and vertical direction, horizontal direction, etc. Alternatively, as shown in FIG. 8, the direction of ejection of starting material 6 and the direction of injection of gas from the gas injection nozzle 7 may be substantially perpendicular to each other in the apparatus 1 according to the seventh embodiment. In this case, the particulate starting material 6 thus ejected changes its moving direction when acted upon by the gas flow. Thus, the particulate starting material 6 is conveyed substantially perpendicular to the direction of ejection from the ejection portion 123.

While the embodiments have been described with reference to the structure including a concave lens as an acoustic lens, the acoustic lens is not limited thereto. As such an acoustic lens there may be used a fresnel lens, electronic scanning lens or the like.

Figure 5:
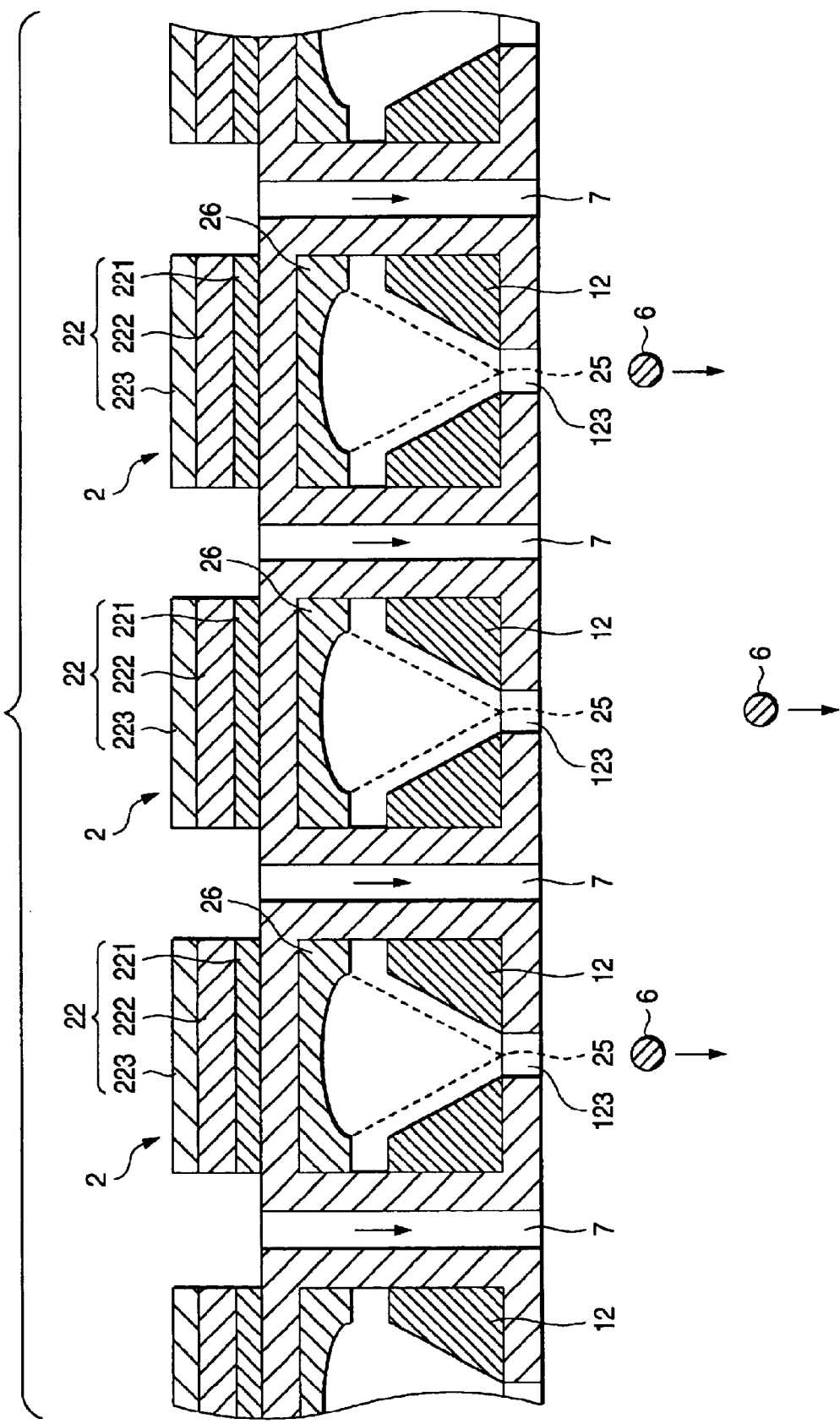
FIG. 5 is an enlarged sectional view of a part in the vicinity of the head portion of the apparatus for the production of a toner according to a fourth embodiment of the invention.
Figure 6:
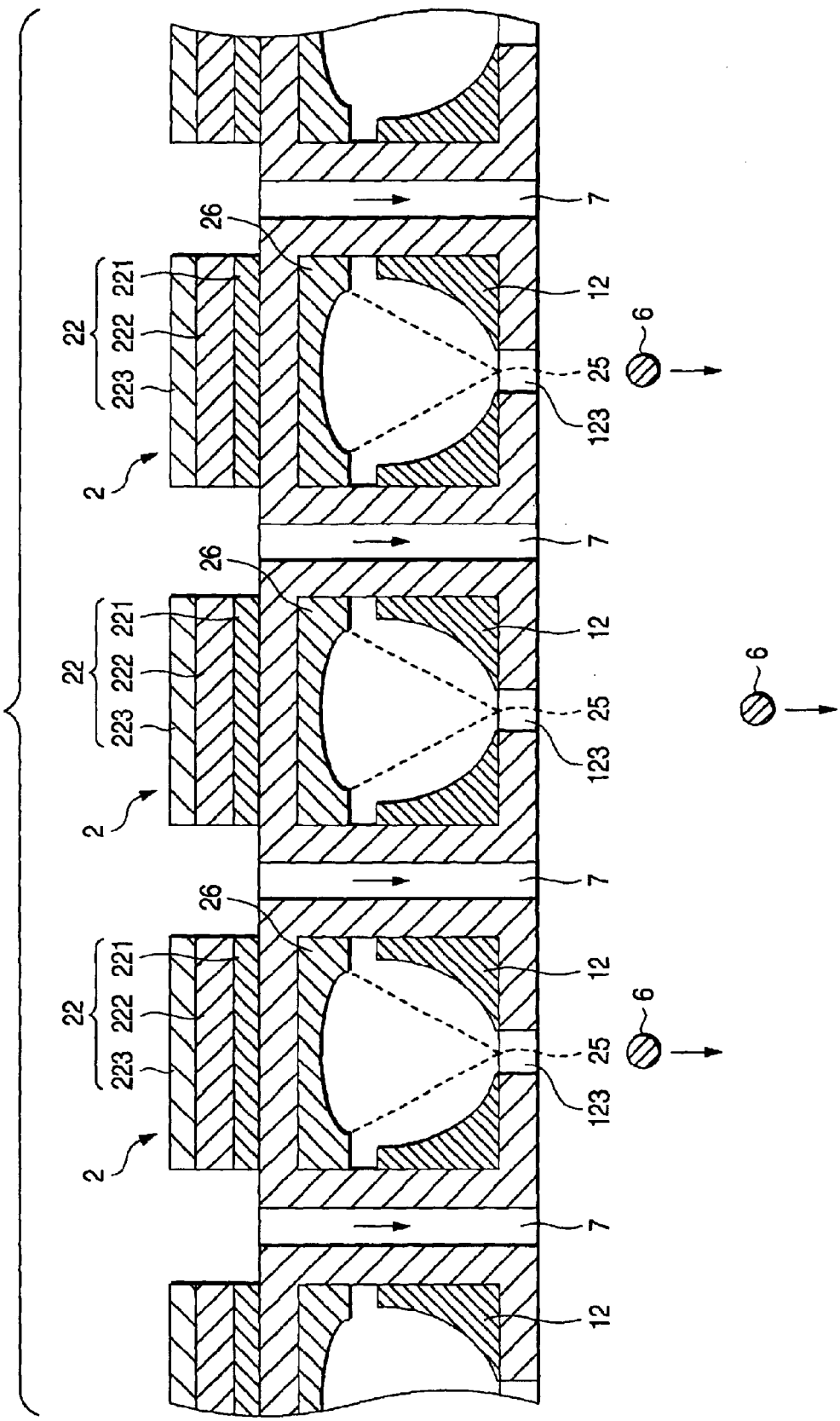
FIG. 6 is a schematic diagram of the structure in the vicinity of an apparatus for the production of a toner according to a fifth embodiment of the invention.
Figure 7:
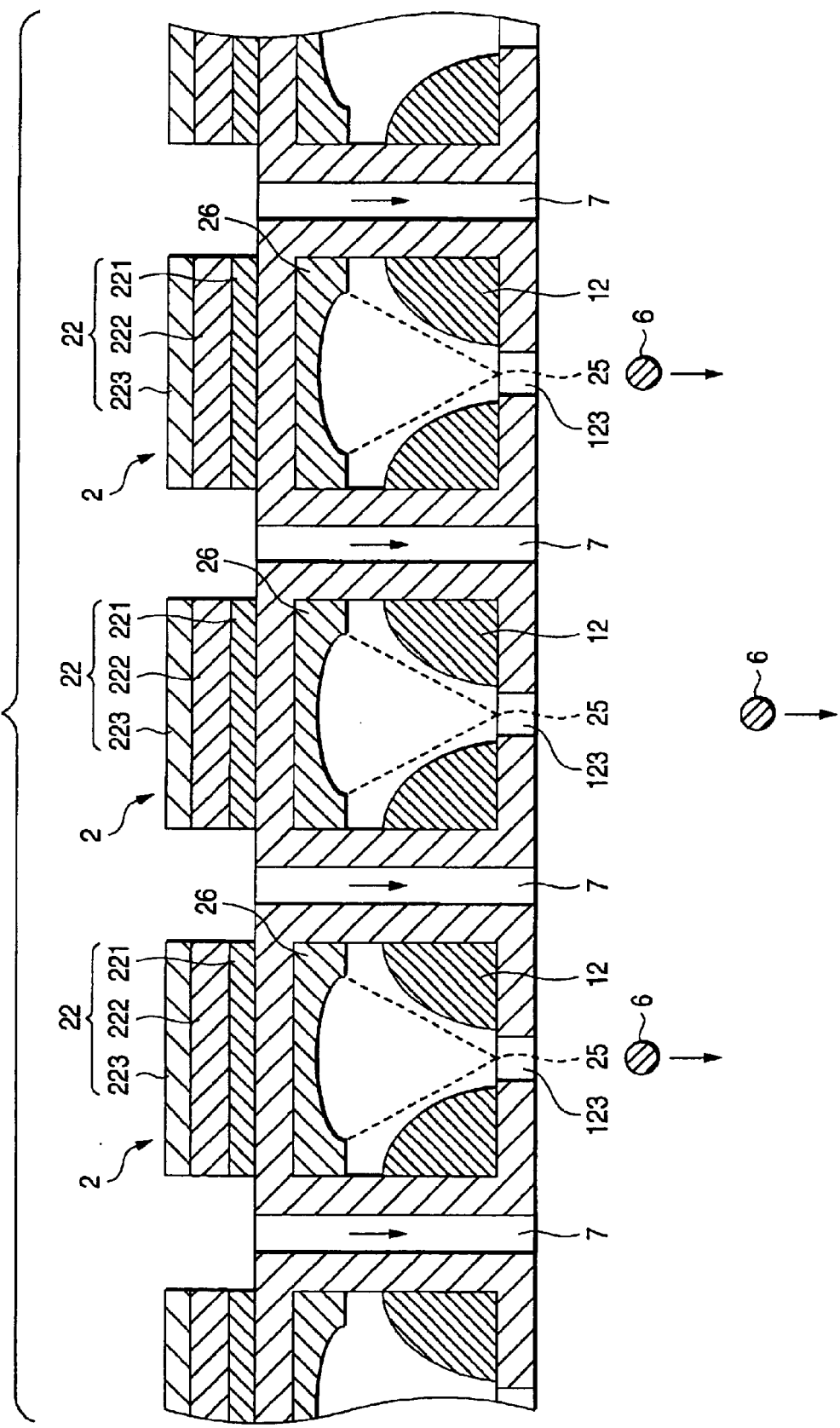
FIG. 7 is a schematic diagram of the structure in the vicinity of an apparatus for the production of a toner according to a sixth embodiment of the invention.

While the embodiments have also been described with reference to the structure including the starting material 6 of toner provided interposed between the acoustic lens 26 and the ejection portion 123, In the apparatus according to the fourth to sixth embodiments, a narrowing member 12 having a shape that converges toward the ejection portion 123 or the like is disposed between the acoustic lens 26 and the ejection portion 123 as shown in FIGS. 5 to 7. In these arrangement, the convergence of the pressure pulse (vibration energy) generated by the piezoelectric element 22 can be assisted, making it possible to more efficiently utilize the pressure pulse generated by the piezoelectric element 22.

EXAMPLE

[1] Production of Toner

Example 3

A resin solution A and a dispersion B were prepared.
<Resin Solution A>

98 parts by weight of a polyester resin (acid value: 26.2 KOHmg/g; hydroxyl number: 12.2 KOHmg/g; glass transition temperature: 62° C.; descending flow tester softening temperature: 104.8° C.), 6 parts by weight of a quinacridone-based pigment and 100 parts by weight of methyl ethyl ketone were put in a sealable vessel equipped with an agitating blade. The agitating blade was then rotated to obtain a resin solution A.
<Dispersion B>

2 parts by weight of zinc salt of salicylic acid, 3 parts by weight of a carnauba wax, 2 parts by weight of a polyester resin and 300 parts by weight of methyl ethyl ketone were put in a sealable vessel with zirconia beads where they were then subjected to ball mill dispersion for 1 hour to obtain a dispersion B.

To the resin solution A thus prepared was then added the dispersion B thus prepared. The mixture was then stirred for 10 minutes to obtain a uniform magenta solution (dispersion) as a starting material of toner. The starting material thus obtained had a viscosity of 182 cps.

The starting material thus obtained was then put in the feeder of the toner producing apparatus shown in FIGS. 1 and 6. The starting material received in the feeder was then supplied into the starting material storing portion of the head portion by a metering pump. The starting material was then ejected from the ejection portion into the solidifying portion. As an acoustic lens there was used one having an aperture (effective aperture) of 150 μm and an F value (value obtained by dividing the focal length [μm] by the effective aperture [μm] of lens) of 1.5 which forms a focal point in the vicinity of the ejection portion. The ejection portion was in a circular form having a diameter of 85 μm.

The ejection of the starting material was effected under the conditions that the temperature of the starting material in the head portion is 25° C., the frequency of the piezoelectric material is 15 kHz, the initial velocity of the starting material ejected from the ejection portion is 6.2 m/sec and the amount of the starting material ejected from the head portion by one droplet is adjusted to 0.5 pl. The ejection of the starting material was also effected in such a manner that at least adjacent head portions among a plurality of head portions eject the starting material at different timings.

During the ejection of the starting material, air having a temperature of 100° C. was injected downward vertically from the gas injection nozzles at a flow rate of 6.5 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.985 and a standard circularity deviation of 0.007. The particulate material had a weight-average particle diameter of 8.6 µm. The standard deviation of weight-average particle diameter was 1.2. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \tag{I}$$

wherein $L_1$ [µm] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 8.6 µm.

Example 4

A liquid starting material having 6 parts by weight of a quinacridone-based pigment and 2 parts by weight of zinc salt of salicylic acid dispersed in 100 parts by weight of a molten polyolefin resin was obtained. The starting material thus obtained had a viscosity of 210 cps at 120° C.

The starting material thus obtained was then put in the feeder of the toner producing apparatus shown in FIGS. 1 and 4. The starting material received in the feeder was then supplied into the starting material storing portion of the head portion by a metering pump. The starting material was then ejected from the ejection portion into the solidifying portion. As an acoustic lens there was used one having an aperture (effective aperture) of 300 µm and an F value of 1.0 which forms a focal point in the vicinity of the ejection portion. The ejection portion was in a circular form having a diameter of 120 µm.

The ejection of the starting material was effected under the conditions that the temperature of the starting material in the head portion is 120° C., the frequency of the piezoelectric material is 150 MHz, the initial velocity of the starting material ejected from the ejection portion is 3.8 m/sec and the amount of the starting material ejected from the head portion by one droplet is adjusted to 0.5 pl. The ejection of the starting material was also effected in such a manner that at least adjacent head portions among a plurality of head portions eject the starting material at different timings.

During the ejection of the starting material, air having a temperature of 10° C. was injected downward vertically from the gas injection nozzles at a flow rate of 4 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.992 and a standard circularity deviation of 0.006. The particulate material had a weight-average particle diameter of 8.9 µm. The standard deviation of weight-average particle diameter was 1.1. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \tag{I}$$

wherein $L_1$ [µm] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 9.0 µm.

Example 5

A toner was produced in the same manner as in Example 3 except that the head portion of the toner producing apparatus was provided with a narrowing member as shown in FIG. 5.

The particulate material recovered at the solidifying portion had an average circularity of 0.992 and a standard circularity deviation of 0.007. The particulate material had a weight-average particle diameter of 8.6 µm. The standard deviation of weight-average particle diameter was 0.9. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \tag{I}$$

wherein $L_1$ [µm] represents the peripheral length of the projected image of the toner particle to be measured; and $L_0$ represents the peripheral length of the true circle having the same area as that of the projected image of the toner particle to be measured.

The finally obtained toner had an average particle diameter of 8.7 µm on a weight basis.

[2] Evaluation

The various toners thus obtained were each then evaluated for average circularity of toner particles, transfer efficiency, fixing temperature range, durability and fogging.

[2. 1] Average Circularity of Toner Particles

The toners produced in the various examples and comparative examples were each measured for average circularity R. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \tag{I}$$

wherein $L_1$ [µm] represents the peripheral length of the projected image of the toner particle to be measured; and $L_0$ represents the peripheral length of the true circle having the same area as that of the projected image of the toner particle to be measured.

[2. 2] Measurement of Transfer Efficiency

Using a Type LP-2000C color laser printer (produced by SEIKO EPSON CORPORATION), the transfer efficiency of the toners produced in the examples 3 to 5 were evaluated in the following manner.

The toner on the photoreceptor which had been subjected to development (before transfer) and the toner on the photoreceptor after transfer (after printing) were sampled with separate tapes, and then each measured for weight. The value obtained by (Wb−Wa)×100/Wb was defined to be transfer efficiency supposing that Wb [g] is the weight of the toner on the photoreceptor before transfer and Wa [g] is the weight of the toner on the photoreceptor after transfer.

[2. 3] Durability

The toners obtained in the various examples and the various comparative examples were each packed in the cartridge of a Type LP-2000C color laser printer (produced by SEIKO EPSON CORPORATION). These cartridges were each then subjected to running over 5,000 sheets of paper. The image on the 4901 st to 5000th printed matters were each then evaluated according to the following four-step criterion:

E (excellent): No streak or disturbance observed on image;

G (good): Little or no streak or disturbance observed on image;

F (fail): Some streak or disturbance observed on image;

P (poor): Definite streak or disturbance observed on image

These results are set forth in Table 2 below with the results of standard deviation of circularity of toner particles, average particle diameter of toner particles and standard deviation of particles diameters.

TABLE 2

|  | Average circularity | Standard deviation of circularity | Average particle diameter [µm] | Standard deviation of particle diameter [µm] | Transfer efficiency [%] | Evaluation of durability |
|---|---|---|---|---|---|---|
| Example 3 | 0.985 | 0.007 | 8.6 | 1.2 | 99.5 | E |
| Example 4 | 0.992 | 0.006 | 8.9 | 1.1 | 99.6 | E |
| Example 5 | 0.992 | 0.007 | 8.6 | 0.9 | 99.8 | E |

As can be seen in Table 2, the toners of the invention have a great circularity and a sharp particle size distribution. Further, all the toners of the invention are excellent in transfer efficiency and durability and have no problems with image density, background stain, transfer and fixing. Thus, printed matters having a sharpness in the vicinity of printed area and little density unevenness were obtained.

In the case where a spray drying process is employed, even if various conditions such as gas injection pressure and starting material temperature are predetermined optimum, the resulting particulate toner normally has a circularity of about 0.97, a standard circularity deviation of about 0.040 and a standard particle diameter deviation of about 2.7 µm.

Toners were prepared in the same manner as in the various examples except that as the coloring agents there were used C. I. pigment blue 15:3, C. I. pigment yellow 93 and carbon black instead of quinacridone-based pigment, respectively. These toners were each then evaluated in the same manner as mentioned above. The results were similar to that of the various examples.

A toner producing apparatus was produced in the same manner as in Example 5 except that the head portion had a structure as shown in FIGS. 6 and 7. Using this toner producing apparatus, a toner was prepared in the same manner as in Example 5. The toner thus obtained was then evaluated in the same manner as mentioned above. The results thus obtained were similar to that of the examples.

A toner producing apparatus was produced in the same manner as in Example 4 except that the head portion had a structure as shown in FIGS. 5 to 7. Using this toner producing apparatus, a toner was prepared in the same manner as in Example 4. The toner thus obtained was then evaluated in the same manner as mentioned above. The results thus obtained were similar to that of the examples.

Next, the apparatus 1 for the production of a toner according to the eighth embodiment will be described below in detail referring to FIGS. 1 and 9. The apparatus 1 of this embodiment is identical to the apparatus 1 of the first embodiment except for a configuration of a head portion 2.

The head portion 2 has a starting material storing portion 321, a heating element 322, and an ejection portion 323.

The starting material storing portion 321 is cylindrical and stores a starting material 6 having a fluidity in the interior thereof. The starting material 6 may be in the form of solution having at least part of the components dissolved in a solvent (hereinafter referred simply to as "solution state") or may be molten in at least part of the components thereof (hereinafter referred simply to as "molten state").

The heating element 322 has a function of generating a heat energy upon the application of a voltage. The heat energy generated by the heating element 322 causes the starting material 6 stored in the starting material storing portion 321 to be rapidly heated and violently boiled, producing air bubbles 312 in the starting material storing portion 321.

The change of volume of air bubbles 312 generated in the starting material storing portion 321 causes the starting material 6 stored in the starting material storing portion 321 to be ejected from the ejection portion 323 into the solidifying portion 3.

A protective membrane 324 for preventing the starting material 6 and the heating element 322 from coming in direct contact with each other is provided interposed between the starting material storing portion 321 and the heating element 322.

The shape of the ejection portion 323 is not specifically limited but is preferably substantially circular. In this arrangement, the sphericity of the starting material 6 and the particulate toner 9 thus ejected can be enhanced.

The diameter (nozzle diameter) of the ejection portion 323, if it is substantially circular, is preferably from 5 to 500 µm, more preferably from 10 to 200 µm. When the diameter of the ejection portion 323 falls below the above defined lower limit, clogging can easily occur in the vicinity of the ejection portion 323. On the contrary, when the diameter of the ejection portion 323 exceeds the above defined upper limit, it is made difficult to control the size of the droplet of the starting material 6 thus ejected.

By repeatedly effecting the generation of the heat energy, the volume of air bubbles 312 in the starting material storing portion 321 changes with time (air bubbles 312 are generated intermittently in the starting material storing portion 321), causing the particulate starting material 6 to be repeatedly ejected from the starting material storing portion 321.

As mentioned above, the this embodiment is characterized in that a starting material having a fluidity is ejected in particulate form with the volume change of air bubbles generated in the starting material by a heat energy generated by a heating element and then solidified.

This embodiment involves repeated generation of heat energy causing the change of volume of air bubbles in the starting material storing portion with time (intermittent generation of air bubbles in the starting material storing portion) that allows the starting material to be ejected intermittently one droplet by one droplet, making it possible to obtain a toner having a stable shape and making it relatively easy to render the particulate toner thus produced highly spherical (close to geometrically complete sphere).

Further, in this embodiment, the period of generation of heat energy by the heating element, the opening area of the ejection portion (nozzle diameter), the temperature and viscosity of the starting material, the amount of the starting material to be ejected by one droplet, etc. can be relatively accurately controlled, making it easy to control the shape and size of the resulting toner to be desired values.

Moreover, this embodiment involves the use of heat energy generated by a heating element. Thus, by properly controlling the period of generation of heat energy, the starting material can be ejected at a predetermined interval of time. In this manner, the collision and agglomeration of the particles thus ejected can be effectively prevented, making it difficult to form an odd-shaped powder as compared with the use of related art spray drying process.

Further, by properly controlling the amount of the starting material to be ejected by one droplet, the period of generation of heat energy, etc., the produced amount of toner, etc. can be easily and certainly controlled.

The generation of the aforementioned heat energy may be accomplished by any method but is preferably accomplished by the application of an alternating voltage to the heating element 322. By applying an alternating voltage to generate a heat energy, the period of generation of air bubbles 312 and the change of volume of air bubbles 312 with time can be easily and accurately controlled. As a result, the produced amount of toner, the size of the particulate toner 9, etc. can be accurately controlled.

In the case where an alternating voltage is applied to generate a heat energy, the frequency of the alternating voltage applied to the heating element 322 is not specifically limited but is preferably from 1 to 50 kHz, more preferably from 5 to 30 kHz. When the frequency of the alternating voltage falls below the above defined lower limit, the productivity of toner is lowered. On the contrary, when the frequency of the alternating voltage exceeds the above defined upper limit, the ejection of the particulate starting material 6 cannot be followed, causing the size of one droplet of the starting material 6 to be dispersed drastically.

The initial velocity of the starting material 6 ejected from the head portion 2 into the solidifying portion 3 is preferably from 0.1 to 10 m/sec, from 2 to 8 m/sec. When the initial velocity of the starting material 6 falls below the above defined lower limit, the producibility of toner is lowered. On the other hand, when the initial velocity of the starting material 6 exceeds the above defined upper limit, a tendency is given that the sphericity of the particulate toner 9 is reduced.

The viscosity of the starting material 6 ejected from the head portion 2 is not specifically limited but is preferably from 1 to 1,000 cps, more preferably from 1 to 300 cps. When the viscosity of the starting material 6 falls below the above defined lower limit, it is made difficult to control thoroughly the size of the particles (particulate starting material 6) ejected, occasionally increasing the dispersion of size of the toner particles 9 thus obtained. On the contrary, when the viscosity of the starting material 6 exceeds the above defined upper limit, a so-called "blank shooting", i.e., ejection of air bubbles prior to the starting material 6 to be ejected can easily occur, making it difficult to control the size and shape of the resulting particulate toner 9 and the produced amount of toner.

The ejected amount of the starting material 6 by one droplet is not specifically limited but is preferably from 0.05 to 500 pl, more preferably from 0.1 to 50 pl. By predetermining the ejected amount of the starting material 6 by one droplet to be within the above defined range, the finally obtained particulate toner 9 can be provided with a proper particle diameter.

The toner producing apparatus 1 having a shown structure has a plurality of head portions 2. From these head portions 2 are each ejected the particulate starting material 6 into the solidifying portion 3.

The head portions 2 may be arranged to eject the starting material 6 at almost the same time. However, it is preferably controlled such that at least two adjacent head portions ejected the starting material 6 at different timings. In this arrangement, the particles of the starting material 6 ejected from the adjacent head portions 2 can be more effectively prevented from colliding with each other or being agglomerated before being solidified.

As shown in FIG. 1, the toner producing apparatus 1 has a gas flow supplying unit 10. The gas flow supplying unit 10 is arranged such that a gas supplied therefrom is injected at almost uniform pressure from gas injection nozzles 7 provided between the head portions 2 through a duct 101. In this manner, the particulate starting material 6 which has been intermittently ejected from the ejection portion 323 can be solidified while being conveyed at a controlled interval. As a result, the collision and agglomeration of the particulate starting material 6 thus ejected can be more effectively prevented.

Further, by injecting the gas supplied from the gas flow supplying unit 10 from the gas injection nozzle 307, a gas flow can be formed in substantially one direction (downward as viewed in the drawing) in the solidifying portion 3. When such a gas flow is formed, the particulate starting material 6 (particulate toner 9) can be more efficiently conveyed in the solidifying portion 3.

Further, when a gas is injected from the gas injection nozzle 307, an air flow curtain is formed between the particles ejected from the head portions 2, making it possible to more effectively prevent the collision and agglomeration of the particles ejected from the adjacent head portions.

The gas flow supplying unit 10 is also provided with a heat exchanger 11. In this arrangement, the temperature of the gas injected from the gas injection nozzle 8 can be predetermined to be a desired value. In other words, when the starting material 6 is in the form of solution, a gas having a relatively high temperature can be injected. On the contrary, when the starting material 6 is in molten form, a gas having a relatively low temperature can be injected. As a result, the particulate starting material 6 which has been ejected into the solidifying portion 3 can be efficiently solidified.

When there is provided such a gas flow supplying unit 10, the solidifying rate of the starting material 6 ejected from the ejection portion 323, etc. can be easily controlled, e.g., by adjusting the supplied amount of gas flow.

The temperature of the gas injected from the gas injection nozzle 307 depends on the composition of the resin and solvent contained in the starting material 6, etc. but preferably falls within the following range.

In other words, when the starting material 6 is molten state, the temperature of the gas injected from the gas injection nozzle 307 is preferably from 50° C. to 350° C., more preferably from 100° C. to 300° C. In this arrangement, the solvent can be efficiently removed from the starting material 6 while keeping the shape of the particulate toner 9 thus obtained uniform, making it possible to further enhance the productivity of toner.

In the case where the starting material 6 is in molten state, the temperature of the gas ejected from the gas injection nozzle 307 is preferably from 0° C. to 100° C., more preferably from 5° C. to 50° C. In this arrangement, the particulate starting material 6 can be cooled and solidified while keeping the shape of the particulate toner 9 thus obtained uniform, making it possible to further enhance the productivity of toner.

The particulate starting material 6 ejected from the head portion 2 is solidified while being conveyed in the solidifying portion 3 to form a particulate toner 9.

The solidifying portion 3 is formed by a cylindrical housing 31.

The particulate starting material 6 may be solidified with the gas injected from the gas injection nozzle 307 or may be solidified by other means. For example, a heat source or cooling source disposed inside or outside the housing 31 may be used to solidify the starting material 6. Alternatively, the housing 31 may be a jacket having a heat medium or cooling medium path formed therein. In the case where the starting material 6 ejected from the head portion 2 is the form of solution, the interior of the housing 31 is put under reduced pressure to remove the solvent from the starting material 6, thereby obtaining a solidified particulate toner 9.

The process for the production of the particulate toner 9 is not limited to the above process involving the removal of the solvent from the starting material 6 in the form of solution or the cooling and solidification of the molten starting material 6. For example, in the case where the starting material 6 contains a resin material precursor (e.g., monomer, dimer and oligomer corresponding to the above resin material), the particulate toner 9 may be obtained by a process involving the progress of polymerization reaction in the solidifying portion 3.

To the housing 31 is connected a voltage applying unit 8 for applying a voltage to the housing 31. By allowing the voltage applying unit 8 to apply a voltage having the same polarity as that of the particulate starting material 6 (particulate toner 9) to the inner surface of the housing 31, the following effects can be obtained.

In general, a particulate toner is positively or negatively charged. Therefore, when there are materials charged with a polarity different from the particulate toner, a phenomenon occurs that the particulate toner is electrostatically attracted to the charged materials. On the contrary, when there are materials charged with the same polarity as that of the particulate toner, the charged materials and the particulate toner repel each other, making it possible to effectively prevent the above phenomenon that the toner is attracted to the charged materials. Accordingly, by applying a voltage having the same polarity as that of the particulate starting material 6 (particulate toner 9) to the inner surface of the housing 31, the attraction of the starting material 6 (particulate toner 9) to the inner surface of the housing 31 can be effectively prevented. In this arrangement, the production of an odd-shaped particulate toner can be effectively prevented and the efficiency of recovery of the particulate toner 9 can be enhanced.

The housing 31 has a reduced diameter portion 311 the inner diameter of which decreases downward as viewed in FIG. 1 in the vicinity of the recovery portion 5. The provision of the reduced diameter portion 311 makes it possible to efficiently recover the particulate toner 9. As previously mentioned, the starting material 6 ejected from the ejection portion 323 is solidified in the solidifying portion 3. The solidification of the starting material 6 is almost fully completed in the vicinity of the recovery portion 5. Thus, even when the particles come in contact with each other in the vicinity of the reduced diameter portion 311, problems such as agglomeration occur little.

The particulate toner 9 obtained by the solidification of the particulate starting material 6 is then recovered by the recovery portion 5.

The toner thus obtained may be optionally subjected to various treatments such as classification and external addition.

The classification may be accomplished by the use of sieve, air classifier or the like.

Examples of the external additives to be used in external addition include particulate material of inorganic material such as metal oxide (e.g., silica, aluminum oxide, titanium oxide, strontium titanate, cerium oxide, magnesium oxide, chromium oxide, titania, zinc oxide, alumina, magnetite), nitride (e.g., silicon nitride) and metal salt (e.g., calcium sulfate, calcium carbonate, metal salt of aliphatic acid), organic material (e.g., acrylic resin, fluororesin, polystyrene resin, polyester resin, metal salt of aliphatic acid) and composite thereof.

Alternatively, as the external additives there may be used those obtained by subjecting the particulate materials to surface treatment with HMDS, silane-based coupling agent, titanate-based coupling agent, fluorine-containing silane-based coupling agent, silicone oil or the like.

The toner of the invention thus produced has a uniform shape and a sharp particle size distribution. In particular, in the invention, a particulate toner having a substantially spherical form can be obtained.

In some detail, the toner (particulate toner) preferably has an average circularity R of not smaller than 0.95, more preferably not smaller than 0.97, even more preferably not smaller than 0.98 as represented by the following equation (I). When the average circularity R is not smaller than 0.95, the transfer efficiency of toner can be further enhanced.

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.

The toner is preferably arranged such that the standard deviation of particle diameter of particles is not greater than 1.5 $\mu$m, more preferably not greater than 1.0 $\mu$m. When the standard deviation of particle diameter of particles is not greater than 1.5 $\mu$m, the dispersion of chargeability, fixability, etc. can be drastically reduced, thereby further enhancing the reliability of the toner as a whole.

The average particle diameter of the toner thus obtained on a weight basis is preferably from 2 $\mu$m to 20 $\mu$m, more preferably from 4 $\mu$m to 10 $\mu$m. When the average particle diameter of the toner falls below the above defined lower limit, the toner particles cannot be uniformly charged and have a raised attractive force to the surface of an electrostatic latent image carrier (e.g., photoreceptor), occasionally increasing the amount of the toner left untransferred. On the contrary, when the average particle diameter of the toner exceeds the above defined upper limit, the reproducibility of image formed by the toner at its contour, particularly in the development of letter image or light pattern, is lowered.

While preferred embodiments of the apparatus and process for producing a toner and the toner according to the invention have been described, the invention is not limited thereto.

For example, the various parts constituting the apparatus for producing a toner according to the embodiments may be replaced by any other parts having the same function or may further have other constitutions. While the above embodiments have been described with reference to the structure arranged to eject the particulate starting material in the downward and vertical direction, the direction of ejection of starting material may be any of upward and vertical direction, horizontal direction, etc. Alternatively, as shown in FIG. 10, the direction of ejection of starting material 6 and the direction of injection of gas from the gas injection nozzle 307 may be substantially perpendicular to each other in the apparatus 1 according to the ninth embodiment. In this case, the particulate starting material 6 thus ejected changes its moving direction when acted upon by the gas flow. Thus, the particulate starting material 6 is conveyed substantially perpendicular to the direction of ejection from the ejection portion 323.

EXAMPLE

[1] Production of Toner

Example 6

A resin solution A and a dispersion B were prepared.

<Resin Solution A>

98 parts by weight of a polyester resin (acid value: 26.2 KOHmg/g; hydroxyl number: 12.2 KOHmg/g; glass transition temperature: 62° C.; descending flow tester softening temperature: 104.8° C.), 6 parts by weight of a quinacridone-based pigment and 100 parts by weight of methyl ethyl ketone were put in a sealable vessel equipped with an agitating blade. The agitating blade was then rotated to obtain a resin solution A.

<Dispersion B>

2 parts by weight of zinc salt of salicylic acid, 3 parts by weight of a carnauba wax, 2 parts by weight of a polyester resin and 300 parts by weight of methyl ethyl ketone were put in a sealable vessel with zirconia beads where they were then subjected to ball mill dispersion for 1 hour to obtain a dispersion B.

To the resin solution A thus prepared was then added the dispersion B thus prepared. The mixture was then stirred for 10 minutes to obtain a uniform magenta solution (dispersion) as a starting material of toner.

Figure 9:
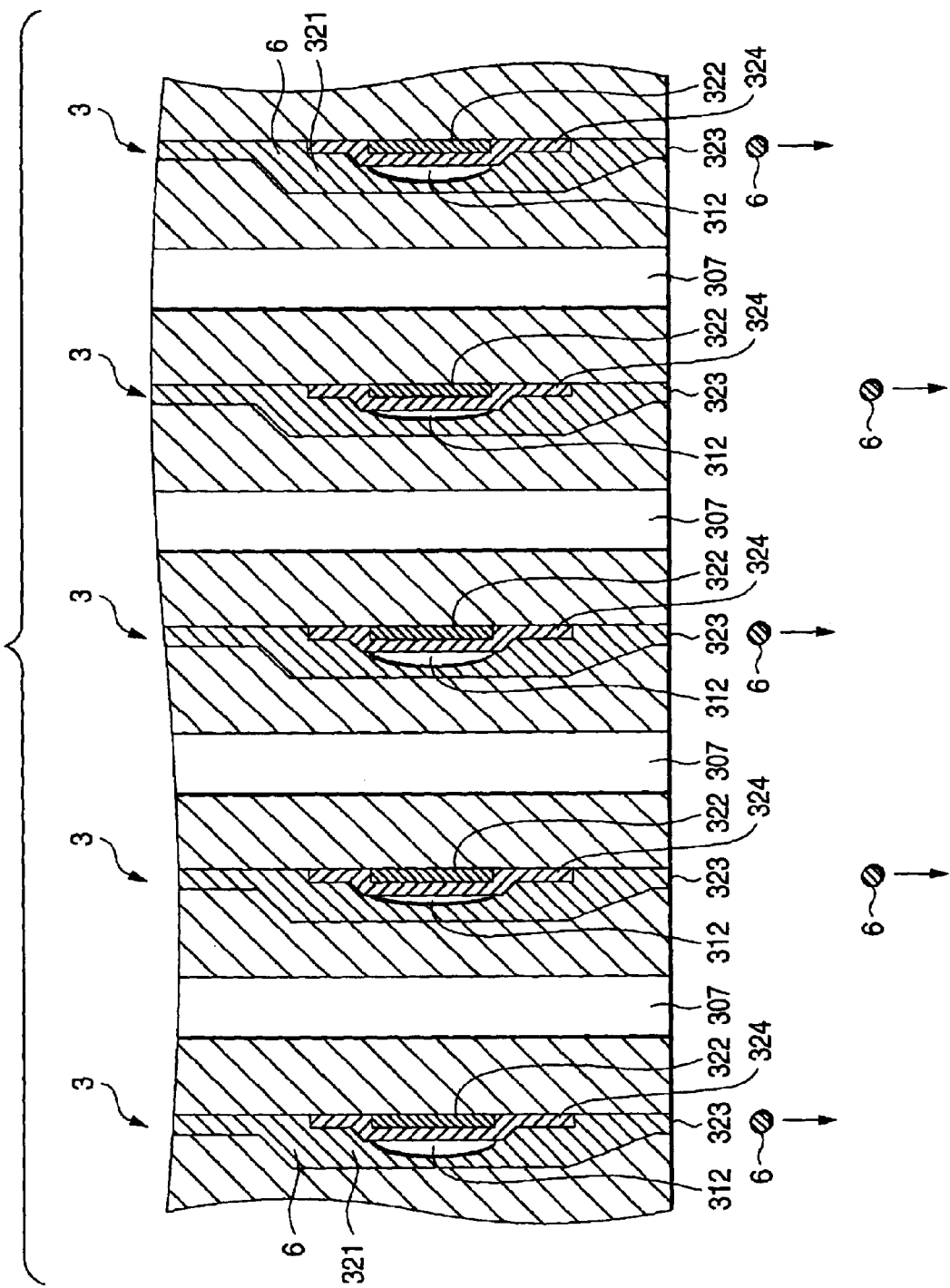
FIG. 9 is an enlarged sectional view of a part in the vicinity of the head portion of the apparatus for the production of a toner of FIG. 1 according to a eighth embodiment of the invention.

The starting material thus obtained was then put in the feeder of the toner producing apparatus shown in FIGS. 1 and 9. The starting material received in the feeder was then supplied into the starting material storing portion of the head portion by a metering pump. The starting material was then ejected from the ejection portion into the solidifying portion. The ejection portion was in a circular form having a diameter of 25 $\mu$m.

The ejection of the starting material was accomplished by applying a high frequency alternating voltage of 20 kHz to the heating element to cause the periodic change of volume of air bubbles generated in the starting material storing portion. The initial velocity of the starting material ejected from the ejection portion was 3.5 m/sec. The amount of the starting material to be ejected by one droplet from the head portion was 4 pl. The viscosity of the starting material ejected from the ejection portion was 182 cps (25° C). The ejection of the starting material was also effected in such a manner that at least adjacent head portions among a plurality of head portions eject the starting material at different timings.

During the ejection of the starting material, air having a temperature of 100° C. was injected downward vertically from the gas injection nozzles at a flow rate of 3 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.985 and a standard circularity deviation of 0.007. The particulate material had a weight-average particle diameter of 8.6 $\mu$m. The standard deviation of weight-average particle diameter was 1.2. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \qquad (I)$$

wherein $L_1$ [$\mu$m] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 8.7 $\mu$m.

Example 7

A liquid starting material having 6 parts by weight of a quinacridone-based pigment and 2 parts by weight of zinc salt of salicylic acid dispersed in 100 parts by weight of a molten polyolefin resin was obtained.

The starting material thus obtained was then put in the feeder of the toner producing apparatus shown in FIGS. 1 and 9. The starting material received in the feeder was then supplied into the starting material storing portion of the head portion by a metering pump. The starting material was then ejected from the ejection portion into the solidifying portion. The ejection portion was in a circular form having a diameter of 25 $\mu$m. The temperature of the starting material supplied into the starting material storing portion was 120° C.

The ejection of the starting material was accomplished by applying a high frequency alternating voltage of 24 kHz to the heating element to cause the periodic change of volume of air bubbles generated in the starting material storing portion. The initial velocity of the starting material ejected from the ejection portion was 3 m/sec. The amount of the starting material to be ejected by one droplet from the head portion was 2 pl. The viscosity of the starting material ejected from the ejection portion was 210 cps (120° C.). The ejection of the starting material was also effected in such a manner that at least adjacent head portions among a plurality of head portions eject the starting material at different timings.

During the ejection of the starting material, air having a temperature of 10° C. was injected downward vertically from the gas injection nozzles at a flow rate of 3 m/sec. A voltage was applied to the housing at the solidifying portion such that the potential at the inner surface thereof was −200 V.

The particulate material solidified in the solidifying portion was then recovered at a cyclone. The particulate material thus recovered had an average circularity of 0.992 and a standard circularity deviation of 0.006. The particulate material had a weight-average particle diameter of 8.9 μm. The standard deviation of weight-average particle diameter was 1.1. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \quad (I)$$

wherein $L_1$ [μm] represents the peripheral length of the projected image of the toner particle to be measured; and $L_0$ represents the peripheral length of the true circle having the same area as that of the projected image of the toner particle to be measured.

To 100 parts by weight of the particulate material thus obtained were then added 0.5 parts by weight of a hydrophobic silica to obtain a final toner. The finally obtained toner had a weight-average particle diameter of 9.0 μm.

[2] Evaluation

The various toners thus obtained were each then evaluated for average circularity of toner particles, transfer efficiency, fixing temperature range, durability and fogging.

[2. 1] Average Circularity of Toner Particles

The toners produced in the examples 6 and 7, and comparative examples were each measured for average circularity R. For the measurement of circularity, a Type FPIA-2000 flow type particle image analyzer (produced by Toa Medical Co., Ltd.) was used. The measurement was effected in an aqueous dispersion. The circularity R is represented by the following equation (I):

$$R = L_0/L_1 \quad (I)$$

wherein $L_1$ [μm] represents the peripheral length of the projected image of the toner particle to be measured; and $L_0$ represents the peripheral length of the true circle having the same area as that of the projected image of the toner particle to be measured.

[2. 2] Measurement of Transfer Efficiency

Using a Type LP-2000C color laser printer (produced by SEIKO EPSON CORPORATION), the transfer efficiency of the toners produced in the aforementioned various examples were evaluated in the following manner.

The toner on the photoreceptor which had been subjected to development (before transfer) and the toner on the photoreceptor after transfer (after printing) were sampled with separate tapes, and then each measured for weight. The value obtained by $(Wb-Wa) \times 100/Wb$ was defined to be transfer efficiency supposing that Wb [g] is the weight of the toner on the photoreceptor before transfer and Wa [g] is the weight of the toner on the photoreceptor after transfer.

[2. 3] Durability

The toners obtained in the examples 6 and 7, and the aforementioned various comparative examples were each packed in the cartridge of a Type LP-2000C color laser printer (produced by SEIKO EPSON CORPORATION). These cartridges were each then subjected to running over 5,000 sheets of paper. The image on the 4901st to 5000th printed matters were each then evaluated according to the following four-step criterion:

E (excellent): No streak or disturbance observed on image;

G (good): Little or no streak or disturbance observed on image;

F (fail): Some streak or disturbance observed on image;

P (poor): Definite streak or disturbance observed on image

These results are set forth in Table 3 below with the results of standard deviation of circularity of toner particles, average particle diameter of toner particles and standard deviation of particles diameters (on a weight basis).

Table 3

TABLE 3

| | Average circularity | Standard deviation of circularity | Average particle diameter [μm] | Standard deviation of particle diameter [μm] | Transfer efficiency [%] | Evaluation of durability |
|---|---|---|---|---|---|---|
| Example 1 | 0.985 | 0.007 | 8.6 | 1.2 | 99.2 | E |
| Example 2 | 0.992 | 0.006 | 9.0 | 1.1 | 99.6 | E |

As can be seen in Table 3, the toners of the invention have a great circularity and a sharp particle size distribution. Further, all the toners of the invention are excellent in transfer efficiency and durability and have no problems with image density, background stain, transfer and fixing. Thus, printed matters having a sharpness in the vicinity of printed area and little density unevenness were obtained.

In the case where a spray drying process is employed, even if various conditions such as gas injection pressure and starting material temperature are predetermined optimum, the resulting particulate toner normally has a circularity of about 0.97, a standard circularity deviation of about 0.04 and a standard particle diameter deviation of about 2.7 μm.

Toners were prepared in the same manner as in the aforementioned various examples except that as the coloring agents there were used C. I. pigment blue 15:3, C. I. pigment yellow 93 and carbon black instead of quinacridone-based pigment, respectively. These toners were each then evaluated in the same manner as mentioned above. The results were similar to that of the aforementioned various examples.

What is claimed is:

1. An apparatus for producing a toner from a starting material having a fluidity, comprising:
   a head portion, including:
      a starting material storing portion, which stores the starting material;
      a piezoelectric material, which generates a pressure pulse and applies the pressure pulse to the starting material; and
      an ejection portion, which ejects the starting material with the pressure pulse from the head portion; and
   a solidifying portion, which solidifies the starting material ejected from the head portion into a particulate material.

2. The apparatus as set forth in claim 1, wherein the head portion includes an acoustic lens which converges the pressure pulse; and wherein the ejection portion ejects the starting material with the pressure pulse converged by the acoustic lens.

3. The apparatus as set forth in claim 1, wherein the acoustic lens is disposed such that a focal point is formed in the vicinity of the ejection portion.

4. The apparatus as set forth in claim 1, wherein the head portion includes a narrowing member which has a shape that converges toward the ejection portion, and the narrowing member is disposed between the acoustic lens and the ejection portion.

5. The apparatus as set forth in claim 1, further comprising:
   a conveying unit, which conveys the starting material ejected from the head portion.

6. The apparatus as set forth in claim 5, wherein the conveying unit is a gas flow supplying unit which supplies a gas flow.

7. The apparatus as set forth in claim 1, wherein the head portion is a plurality of head portions.

8. The apparatus as set forth in claim 7, further comprising:
   a gas injection nozzle which injects a gas; and
   wherein the gas injection nozzle is disposed between the adjacent ejection portions of the plurality of head portions.

9. The apparatus as set forth in claim 7, wherein at least two adjacent head portions eject the starting material at different timings.

10. The apparatus as set forth in claim 1, further comprising a voltage applying unit which applies a voltage to the solidifying portion.

11. The apparatus as set forth in claim 1, wherein the ejection portion has substantially circular shape, and has a diameter of from 5 $\mu$m to 500 $\mu$m.

12. A toner produced by using the apparatus for producing the toner as set forth in claim 1.

13. The toner as set forth in claim 12, wherein the toner has a weight-average particle of from 2 to 20 $\mu$m.

14. The toner as set forth in claim 12, wherein the standard deviation of particle diameter of particles on the basis of weight is not greater than 1.5 $\mu$m.

15. The toner as set forth in claim 12, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.

16. A method for producing a toner from a starting material having a fluidity by using the apparatus for producing the toner as set forth in claim 1, comprising the steps of:
   providing a starting material storing portion, which stores the starting material;
   generating a pressure pulse by a piezoelectric material;
   applying the pressure pulse to the starting material;
   ejecting the starting material with the pressure pulse from a head portion by an ejection portion; and
   solidifying the starting material ejected from the head portion into a particulate material by a solidifying portion.

17. An apparatus for producing a toner from a starting material having a fluidity, comprising:
   a head portion, including:
      a starting material storing portion, which stores the starting material;
      a heating element, which applies a heat energy to the starting material to generate an air bubble in the starting material storing portion; and
      an ejection portion, which ejects the starting material with the volume change of the air bubble; and
   a solidifying portion, which solidifies the starting material ejected from the head portion into a particulate material.

18. The apparatus as set forth in claim 17, wherein the heating element generates heat by applying an alternating voltage to the heating element.

19. The apparatus as set forth in claim 17, further comprising:
   a conveying unit, which conveys the starting material ejected from the head portion.

20. The apparatus as set forth in claim 19, wherein the conveying unit is a gas flow supplying unit which supplies a gas flow.

21. The apparatus as set forth in claim 17, wherein the head portion is a plurality of head portions.

22. The apparatus as set forth in claim 21, further comprising:
   a gas injection nozzle which injects a gas; and
   wherein the gas injection nozzle is disposed between the adjacent ejection portions of the head portions.

23. The apparatus as set forth in claim 21, wherein at least two adjacent head portions eject the starting material at different timings.

24. The apparatus as set forth in claim 17, further comprising a voltage applying unit which applies a voltage to the solidifying portion.

25. The apparatus as set forth in claim 17, wherein the ejection portion has substantially circular shape, and has a diameter of from 5 $\mu$m to 500 $\mu$m.

26. A toner produced by using the apparatus for producing the toner as set forth in claim 17.

27. The toner as set forth in claim 26, wherein the toner has a weight-average particle of from 2 to 20 $\mu$m.

28. The toner as set forth in claim 26, wherein the standard deviation of particle diameter of particles on the basis of weight is not greater than 1.5 $\mu$m.

29. The toner as set forth in claim 26, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.

30. The method as set forth in claim 29, further comprising the steps of:
   converging the pressure pulse by an acoustic lens; and
   wherein the starting material is ejected with the pressure pulse converged by the acoustic lens.

31. A method for producing a toner from a starting material having a fluidity by using the apparatus for producing the toner as set forth in claim 17, comprising the steps of:

providing a starting material storing portion, which stores the starting material;

applying a heat energy to the starting material by a heating element;

generating an air bubble in the starting material storing portion by the heat energy; and ejecting the starting material with the volume change of the air bubble by an ejection portion; and solidifying the starting material ejected from the head portion into a particulate material by a solidifying portion.

32. A method for producing a toner from a starting material having a fluidity, comprising the steps of:

ejecting the starting material intermittently with a pressure pulse generated by a piezoelectric material from a head portion; and solidifying the starting material while being conveyed with an air flow through a solidifying portion to form a particulate material.

33. The method as set forth in claim 32, further comprising the step of:

converging the pressure pulse.

34. The method as set forth in claim 32, wherein the pressure pulse is applied to the starting material stored in a starting material storing portion; and wherein the starting material is ejected with the pressure pulse generated by the piezoelectric material from the head portion.

35. The method as set forth in claim 32, further comprising the steps of:

providing a gas flow in substantially one direction; and discharging the starting material ejected by the pressure pulse into the gas flow.

36. The method as set forth in claim 32, wherein the starting material is ejected with the pressure pulse from a plurality of head portions.

37. The method as set forth in claim 36, further comprising the step of:

injecting a gas from the gap between adjacent ejection portions of the head portions.

38. The method as set forth in claim 36, wherein the timing at which the starting material is ejected from at least two adjacent head portions are different.

39. The method as set forth in claim 32, wherein the starting material is ejected while a voltage having the same polarity as that of the starting material is applied to the solidifying portion.

40. The method as set forth in claim 32, wherein the initial velocity of the starting material ejected from the head portion is from 0.1 to 10 m/sec.

41. The method as set forth in claim 32, wherein the viscosity of the starting material in the head portion is from 1 to 1,000 cps.

42. The method as set forth in claim 32, wherein the frequency of the piezoelectric material is from 10 kHz to 500 MHz.

43. The method as set forth in claim 32, wherein the starting material has at least part of its components dissolved in a solvent.

44. The method as set forth in claim 43, further comprising the step of:

removing the solvent from the starting material at the solidifying portion to solidify the starting material.

45. The method as set forth in claim 44, wherein the starting material is cooled at the solidifying portion so that it is solidified.

46. The method as set forth in claim 44, wherein the starting material is heated at the solidifying portion so that it is solidified.

47. The method as set forth in claim 32, wherein at least part of the components of the starting material is in molten state.

48. The method as set forth in claim 32, wherein the amount of one droplet of the starting material to be ejected from the head portion is from 0.05 to 500 pl.

49. A toner produced by the method for producing the toner as set forth in claim 32.

50. The toner as set forth in claim 12, wherein the toner has a weight-average particle of from 2 to 20 $\mu$m.

51. The toner as set forth in claim 49, wherein the standard deviation of particle diameter of particles on the basis of weight is not greater than 1.5 $\mu$m.

52. The toner as set forth in claim 49, wherein the average circularity R represented by the following equation (I) is not smaller than 0.95:

$$R = L_0/L_1 \tag{I}$$

wherein $L_1$ [$\mu$m] represents the peripheral length of the projected image of the toner particle to be measured; and $L_0$ represents the peripheral length of the true circle having the same area as that of the projected image of the toner particle to be measured.

53. A method for producing a toner from a starting material having a fluidity, comprising the steps of:

ejecting the starting material intermittently with a volume change of an air bubble from a head portion; and solidifying the starting material while being conveyed with an air flow through a solidifying portion to form a particulate material.

54. The method as set forth in claim 53, wherein a heat energy generated by a heating element is applied to the starting material stored in a starting material storing portion to generate an air bubble; and wherein the starting material is ejected with the volume change of the air bubble from the head portion.

55. The method as set forth in claim 54, wherein an alternating voltage is applied to the heating element to generate the heat energy.

56. The method as set forth in claim 55, wherein the frequency of the alternating voltage applied to the heating element is from 1 to 50 kHz.

57. The method as set forth in claim 53, further comprising the steps of:

providing a gas flow in substantially one direction; and discharging the starting material ejected by the pressure pulse into the gas flow.

58. The method as set forth in claim 53, wherein the starting material is ejected with the pressure pulse from a plurality of head portions.

59. The method as set forth in claim 57, further comprising the step of:

injecting a gas from the gap between adjacent ejection portions of the head portions.

60. The method as set forth in claim 58, wherein the timing at which the starting material is ejected from at least two adjacent head portions are different.

61. The method as set forth in claim 53, wherein the starting material is ejected while a voltage having the same polarity as that of the starting material is applied to the solidifying portion.

62. The method as set forth in claim 53, wherein the initial velocity of the starting material ejected from the head portion is from 0.1 to 10 m/sec.

63. The method as set forth in claim 53, wherein the viscosity of the starting material in the head portion is from 1 to 1,000 cps.

64. The method as set forth in claim 53, wherein the starting material has at least part of its components dissolved in a solvent.

65. The method as set forth in claim 64, further comprising the step of:

removing the solvent from the starting material at the solidifying portion to solidify the starting material.

66. The method as set forth in claim 65, wherein the starting material is cooled at the solidifying portion so that it is solidified.

67. The method as set forth in claim 65, wherein the starting material is heated at the solidifying portion so that it is solidified.

68. The method as set forth in claim 53, wherein at least part of the components of the starting material is in molten state.

69. The method as set forth in claim 53, wherein the amount of one droplet of the starting material to be ejected from the head portion is from 0.05 to 500 pl.

70. A toner produced by the method for producing the toner as set forth in claim 53.

71. The toner as set forth in claim 70, wherein the toner has a weight-average particle of from 2 to 20 $\mu$m.

72. The toner as set forth in claim 70, wherein the standard deviation of particle diameter of particles on the basis of weight is not greater than 1.5 $\mu$m.

73. The toner as set forth in claim 70, wherein the average circularity R represented by the following equation (I) is not smaller than 0.95:

$$R = L_0/L_1 \qquad (I)$$

wherein $L_1$ [$\mu$m] represents the peripheral length of the projected image of the toner particle to be measured; and $L_0$ represents the peripheral length of the true circle having the same area as that of the projected image of the toner particle to be measured.

* * * * *